United States Patent
Kenkel et al.

(10) Patent No.: US 12,176,966 B2
(45) Date of Patent: Dec. 24, 2024

(54) DETERMINATION AND COMPENSATION OF RADIO FREQUENCY SIGNAL ATTENUATION

(71) Applicant: Shure Acquisition Holdings, Inc., Niles, IL (US)

(72) Inventors: Mark Allen Kenkel, Schaumburg, IL (US); Scott R. Anderson, South Barrington, IL (US); Steven M. Grad, Northbrook, IL (US); Jon Caleb Halverson, Des Plaines, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 130 days.

(21) Appl. No.: 17/733,120

(22) Filed: Apr. 29, 2022

(65) Prior Publication Data
US 2022/0376738 A1  Nov. 24, 2022

Related U.S. Application Data

(60) Provisional application No. 63/192,298, filed on May 24, 2021.

(51) Int. Cl.
*H04B 3/04* (2006.01)
*H04B 1/18* (2006.01)
(Continued)

(52) U.S. Cl.
CPC ............ *H04B 3/06* (2013.01); *H04B 1/18* (2013.01); *H04B 3/46* (2013.01); *H04B 17/0085* (2013.01);
(Continued)

(58) Field of Classification Search
CPC ... H04B 1/18; H04B 3/04; H04B 3/06; H04B 3/14; H04B 3/46; H04B 17/0081; H04L 29/004; H04L 2420/07
See application file for complete search history.

(56) References Cited

U.S. PATENT DOCUMENTS

| 4,138,646 A | 2/1979 | Parato |
| 5,214,505 A | 5/1993 | Rabowsky et al. |

(Continued)

FOREIGN PATENT DOCUMENTS

| CN | 1719891 A | 1/2006 | |
| EP | 2879300 A1 * | 6/2015 | ............... H04B 1/18 |

(Continued)

OTHER PUBLICATIONS

Aug. 22, 2022—(WO) Partial International Search Report and Written Opinion—App PCT/US2022/072072.

(Continued)

*Primary Examiner* — Blane J Jackson
(74) *Attorney, Agent, or Firm* — Banner & Witcoff, Ltd.

(57) ABSTRACT

A wireless microphone system comprises system equipment (for example, rack-mounted equipment including receivers/transceivers, distribution amplifier), one or more transmission line accessories, and a transmission line network connecting the accessories with the system equipment. The transmission line accessory compensates for downlink RF losses on transmission lines between accessories and between an accessory and system equipment. Compensation parameters for the transmission line accessory is determined by the system equipment by generating an uplink RF test signal by an RF source at the system equipment. The RF source may be varied over a plurality of frequencies to determine the compensation parameters over the plurality of frequencies. The system equipment subsequently instructs the transmission line accessory to configure an adjustable RF gain circuit (and also possibly a compensation filter) accordingly. The wireless microphone system may also discover accessories on the transmission line network to facilitate installation and maintenance.

20 Claims, 18 Drawing Sheets

(51) Int. Cl.
*H04B 3/06* (2006.01)
*H04B 3/46* (2015.01)
*H04B 17/00* (2015.01)
*H04R 29/00* (2006.01)

(52) U.S. Cl.
CPC ....... *H04R 29/004* (2013.01); *H04R 2420/07* (2013.01)

(56) References Cited

U.S. PATENT DOCUMENTS

| | | |
|---|---|---|
| 5,847,603 A | 12/1998 | Myer |
| 6,690,922 B1 | 2/2004 | Lindemann |
| 7,155,257 B2 | 12/2006 | Bird et al. |
| 7,463,865 B2 | 12/2008 | Reese et al. |
| 8,311,503 B2 | 11/2012 | Karacaoglu et al. |
| 8,358,980 B2 | 1/2013 | Tajima et al. |
| 8,526,890 B1 | 9/2013 | Chien et al. |
| 9,584,894 B2 * | 2/2017 | Kofler .................. H04B 1/18 |
| 10,419,134 B2 | 9/2019 | Melester et al. |
| 10,470,180 B2 | 11/2019 | Mansouri et al. |
| 2011/0080847 A1 | 4/2011 | Kenkel et al. |
| 2013/0071112 A1 | 3/2013 | Melester et al. |
| 2016/0212558 A1 | 7/2016 | Willemsen et al. |
| 2017/0070822 A1 | 3/2017 | Skovenborg |
| 2019/0132024 A1 | 5/2019 | Zhan et al. |

FOREIGN PATENT DOCUMENTS

| | | |
|---|---|---|
| JP | 2010050575 A | 3/2010 |
| KR | 19990084159 A | 12/1999 |
| KR | 101545752 B1 | 8/2015 |
| KR | 102064978 B1 | 1/2020 |
| WO | 2008048549 A2 | 4/2008 |

OTHER PUBLICATIONS

Oct. 17, 2022—(WO) Partial International Search Report and Written Opinion—App PCT/US2022/072072.

Hsiao, Harry; Antenna Systems: Optimal Reception & Signal Quality; Micropro, Microphone Professionals; 2016.

Sigismondi, Gino and Tapia, Crispin; Wireless Systems Guide: Antenna Setup; A Shure Educational Publication; Shure Incorporated; 2016.

Wireless Micrphone Systems: Concepts of Operation and Design; Lectrosonics, Inc; Mar. 2000.

Self-Calibration for RF Hardware; Engineer Ambitiously; Updated Feb. 4, 2020.

RF Calibration [online]. Fluke Calibration, [retrieved on Feb. 5, 2021]. Retrieved from the Internet: <URL: https://us.flukecal.com/products/rf-calibration>.

* cited by examiner

DETERMINATION AND COMPENSATION OF RADIO FREQUENCY SIGNAL ATTENUATION

This application claims priority to provisional Application No. 63/192,298 filed May 24, 2021, which is incorporated by reference in its entirety herein.

TECHNICAL FIELD

One or more aspects of the disclosure generally relate to a wireless microphone system in which an antenna is connected to one or more transmission line accessories (for example, an antenna accessory and/or in-line amplifier) via a transmission line network (for example, a coaxial network).

BACKGROUND

Multiple (sometimes many) wireless microphones are utilized in a wireless microphone system in order to have a desired coverage for a performance/entertainment venue. Wireless equipment is typically connected to one or more antennas through numerous radio frequency (RF) cables in order to communicate with the wireless microphones. With some venues, the RF cables may be long (sometimes a hundred feet or more), where RF losses are incurred along the RF cables.

In order for a wireless system to properly operate, RF losses along the RF cable should be controlled so that RF signal levels are kept within specified ranges of the wireless microphone system equipment. However, users often incorrectly guess at the RF cable loss or set the RF gain to the maximum level when installing and configuring the wireless microphone system. Moreover, RF cables may be broken or damaged when employing the wireless microphone system.

SUMMARY

This summary is provided to introduce a selection of concepts in a simplified form that are further described below in the Detailed Description. This Summary is not intended to identify key features or essential features of the disclosure.

A wireless microphone system comprises system equipment (for example, rack-mounted equipment including receivers/transceivers and a distribution amplifier), one or more transmission line accessories, and a transmission line network connecting the accessories with the system equipment. A purpose of a transmission line accessory may be, for example, to compensate for RF losses on transmission lines between accessories and between an accessory and system equipment.

With another aspect of the disclosure, a transmission line accessory may be categorized as either an antenna accessory or an in-line amplifier, both of which may be supported on a common platform. An antenna accessory interfaces between an antenna and an RF port of system equipment in order to compensate for RF losses incurred with transmission cables (for example, a coaxial cable between the antenna accessory to the system equipment). However, some configurations have long lengths of transmission cable that necessitate additional amplification, requiring an in-line amplifier accessory between the antenna accessory and the system equipment.

With another aspect of the disclosure, a wireless microphone system comprises system equipment (that includes a receiver and a radio frequency (RF) source), a transmission line accessory, and a transmission line network (that connects the system equipment and the transmission line accessory). The receiver receives a downlink RF signal from a wireless microphone through the transmission line accessory over a communication path provided by the transmission line network. The transmission line accessory (comprising an RF power detector and an adjustable RF gain circuit) compensates for RF losses incurred by the downlink RF signal through the transmission line network. In order to provide desired compensation, the RF source generates an uplink RF test signal at a first RF power level to the first transmission line accessory through the communication path. The system equipment then instructs the transmission line accessory to measure a second RF power level of the uplink RF test signal received at the transmission line accessory (performed by the RF power detector) and to report the second RF power level to a controller (typically comprising a computing device) at the system equipment. The controller subsequently determines an RF gain setting for the adjustable RF gain circuit from the first and second RF levels and sends configuration information indicative of the RF gain setting to the transmission line accessory. The transmission line accessory configures its adjustable RF gain circuit accordingly, to compensate for the gain difference.

With another aspect of the disclosure, a controller at the system equipment interacts with a processing device at a transmission line accessory via a data stream. The data stream may be supported in various manners, for example, through direct current (DC) signaling, audio tone signaling, or modulation of an RF signal using the same physical transmission facilities as the uplink and downlink for RF signals.

With another aspect of the disclosure, an RF source is configured to vary the uplink RF test signal over a plurality of frequencies through a communication path to a transmission line accessory. As instructed by a processing device at the system equipment, the transmission line accessory measures the uplink RF test signal over the plurality of frequencies and reports frequency-dependent information to the system equipment, where the frequency-dependent information is indicative of an RF loss variation through the transmission line network over the plurality of frequencies. The processing device modifies configuration information based on the RF loss variation and instructs the transmission line accessory to provide determined compensation over the plurality of frequencies.

With another aspect of the disclosure, a transmission line accessory compensates for transmission RF losses over a plurality of frequencies by an adjusted RF gain setting of an adjustable RF gain circuit.

With another aspect of the disclosure, a transmission line accessory compensates for transmission RF losses over a plurality of frequencies with a compensation filter in conjunction with an adjustable RF gain circuit.

With another aspect of the disclosure, system equipment discovers transmission line accessories connected to a transmission line network. The system equipment sends a discovery message over a data stream through an RF port. Any connected accessory responds on the data stream. The accessories may be configured in a series or parallel manner or in a combination. One or more responses may be received, depending on a number of accessories that are connected on the transmission line network through the RF port. Based on the responses, the system equipment may update an accessory mapping.

With another aspect of the disclosure, a wireless microphone system may subsequently verify the accessory mapping. In order to do so, system equipment may send discovery messages and compare the responses with what is expected based on the accessory mapping. Any discrepancy may be shown on a graphical representation of the wireless microphone system.

With another aspect of the disclosure, a transmission line accessory may pass through a discovery message to an upstream transmission line accessory that is connected in series.

With another aspect of the disclosure, a transmission line accessory may regenerate a discovery message to an upstream transmission line accessory that is connected in series.

With another aspect of the disclosure, an adjustable gain circuit of a transmission line accessory may comprise an RF attenuator or an adjustable gain amplifier.

With another aspect of the disclosure, a transmission line network may include coaxial cable, twin-lead cable, optical fiber, and/or microstrip transmission lines.

With another aspect of the disclosure, a wireless microphone system comprises system equipment (that includes a receiver), a test transmitter, a transmission line accessory, and a transmission line network (that connects the system equipment and the transmission line accessory). The receiver receives a downlink RF signal from a wireless microphone through the transmission line accessory over a communication path provided by the transmission line network. The transmission line accessory (comprising an RF power detector and an adjustable RF gain circuit) compensates for RF losses incurred by the downlink RF signal through the transmission line network. In order to determine a desired amount of compensation, the test transmitter generates a downlink RF test signal at a first RF power level to the transmission line accessory through the communication path. In addition, the next downlink entity (either another accessory or the system equipment) measures a second RF power level at its RF port. The RF loss of the transmission line network between the two entities can be determined from the first and second RF power levels and consequently compensated for at the accessories.

BRIEF DESCRIPTION OF THE DRAWINGS

A more complete understanding of the exemplary embodiments of the present invention and the advantages thereof may be acquired by referring to the following description in consideration of the accompanying drawings, in which like reference numbers indicate like features and wherein.

DETAILED DESCRIPTION

Figure 1:
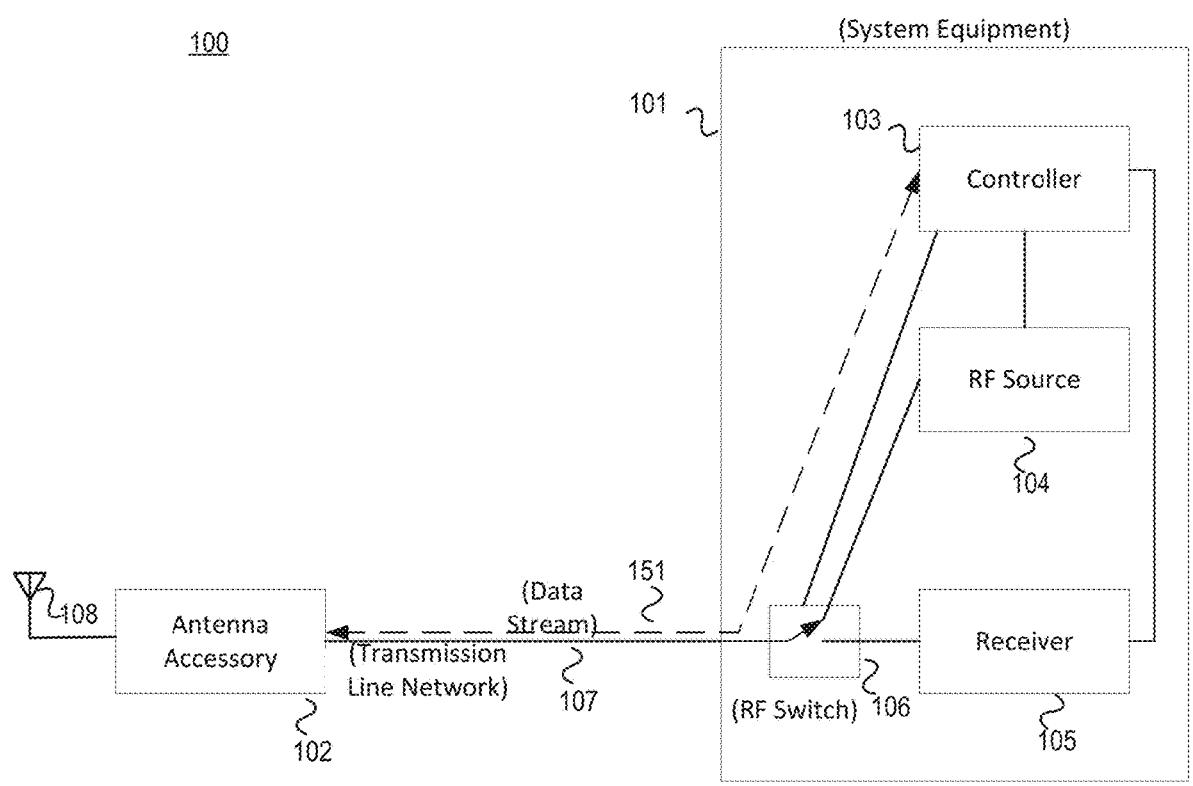
FIG. 1 shows a wireless microphone system where an uplink RF test signal is used to configure a transmission line accessory in accordance with an aspect of the embodiments.

In the following description of the various exemplary embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

With an aspect of the disclosure, a wireless microphone system comprises system equipment (for example rack-mounted receivers/transceivers that are paired with wireless microphones and distribution amplifier, spectrum manager), one or more transmission line accessories, and a transmission line network that connects the system equipment with the one or more transmission line accessories. A transmission line accessory may comprise an antenna accessory that interfaces to an antenna or an in-line amplifier that provides radio frequency (RF) amplification between an antenna accessory and the system equipment. A transmission line network may include coaxial cable, twin-lead cable, and/or microstrip transmission lines.

With an aspect of the disclosure, the RF gain/attenuation in coaxial cables, filters, amplifiers and splitters that form the RF path between the antenna and a destination device (receiver, distribution amplifier, spectrum manager, transmitter or transceiver, and the like) are determined. After determining the losses in the path, the appropriate gain compensation can automatically be applied to installed coaxial accessories such as active antennas and line amplifiers.

With an aspect of the disclosure, a new system of powered antennas, line amplifiers, receivers, transceivers and antenna distribution amplifiers are provided. These devices incorporate RF power detectors and bidirectional coaxial data communication transceivers. To determine the losses in an RF cable network, a calibrated RF source is activated in a rack-mounted device such as a distribution amplifier or receiver. The power detector in the line amplifiers or antenna amplifier measures the received power from the RF source and compares it to the known calibrated source power level or a reference power communicated via the one-wire interface. The difference in the power between detector nodes is the power lost in the intervening cables, filters, and power splitters.

With another aspect of the disclosure, each powered antenna and line amplifier reports the power detected back to a distribution amplifier over a coaxial bidirectional communication network. The distribution amplifier's microcontroller instructs the individual line amplifier and antenna amplifier to apply the appropriate amount of gain to compensate for the loss between intervening amplifier nodes. Applying the appropriate amount of gain reduces the possibility of high external RF signal levels overloading downstream devices if excess gain is applied. However, if the compensating gain were too low, receiver sensitivity may be degraded, resulting in a reduction in coverage area.

With another aspect of the disclosure, an RF source is swept across a frequency range in order to determine a frequency response of the coaxial network. The power level at each frequency is reported back the distribution amplifier for display or use in other software utilities.

With another aspect of the disclosure, a wireless microphone system automates the process of gain compensation and eliminates the need for users to purchase additional RF measurement equipment such as signal generators and RF power meters or spectrum analyzers. With traditional approaches, a user may incorrectly guess the cable loss or may set the compensation gain to the maximum level. The wireless microphone system may also determine whether an RF cable is broken or damaged. Gain compensation may be calculated and applied to the wireless microphone system without removing the system from service.

With another aspect of the disclosure, a wireless microphone system supports a personal monitoring transmitter, where a user (for example, a performer performing at a venue) can hear the performance through a corresponding body pack receiver. The system may include an amplifier circuit in the powered antenna that may be bypassed allowing it to act as a passive antenna. A power detector at the antenna may measure the RF power from the personal monitoring transmitter and communicate the measurement back to the transmitter so that the transmitter can apply additional power to compensate for losses connecting the transmitter to the antenna.

FIG. 1 shows wireless microphone system 100, where an uplink RF test signal (transmitted from RF source 104 to transmission line accessory (antenna accessory) 102 over transmission line network 107) is used to configure transmission line accessory 102 for downlink communications (from transmission line accessory 102 to receiver 105) in accordance with an aspect of the embodiments.

Wireless microphone system 100 comprises system equipment 101 (for example, rack-mounted receiver 105), transmission line accessory 102, transmission line network 107, antenna 108, and one or more wireless microphones (not explicitly shown). In typical system configurations, transmission line network 107 comprises numerous RF cables connecting a plurality of antennas (such as antenna 108) to system equipment 101 through one or more transmission line accessories. RF cables may include coaxial cables, twin-line cables, and/or microstrip transmission lines.

System equipment 101 receives RF signals from the wireless microphones (in other words, via the downlink) through antenna 108, transmission line accessory 102, and transmission line network 107, where accessory 102 provides an amplification to compensate for RF losses incurred through transmission line network 107.

Receiver 105 receives an RF signal over the downlink from a wireless microphone through antenna 108, transmission line accessory 102, transmission line network 107, and RF switch 106 (when configured in the other position from what is shown in FIG. 1), Otherwise, RF test signal is provided on the uplink from RF source 104 on transmission line network 107 when RF switch 106 is configured in the shown position.

Controller 103 controls RF source 104 and RF switch 106 as well as antenna accessory 102 over data stream 151 on transmission line network 107. Data stream 151 may be supported in various manners, for example, through direct current (DC) signaling, audio tone signaling, or modulation of an RF signal using the same physical transmission facilities as the uplink and downlink for RF signals.

Data stream 151 may be bidirectional, conveying commands/information from controller 103 to transmission line accessory 102 and information from transmission line accessory 102 to controller 103.

As will be discussed in further detail, RF source 104 generates an uplink RF test signal (as instructed by controller 103) at a calibrated signal level (amplitude) at a given frequency when RF switch 106 is configured in the shown calibration mode. Transmission line accessory 102 measures and reports the received uplink RF test signal so that the RF loss incurred can be determined by controller 103. Because RF loss characteristics of transmission line network 107 is typically the same in both directions (reciprocity), the determined RF loss also applies to the downlink (from transmission line accessory 102 to receiver 105).

With some embodiments, system equipment 101 may include one or more transceivers (not explicitly shown) to communicate with wireless microphones in both an uplink (to a wireless microphone) and a downlink (from a wireless microphone).

With some embodiments, a rack-mounted transceiver (in accordance with the transmit frequency and transmit power of the transceiver) may be used in place of the calibrated RF source 104. If the transceivers are used with a distribution amplifier, the aggregate power of the transceiver may be measured or calculated and used in place of the calibrated RF source 104.

With some embodiments, when system equipment 102 does not have a priori information whether a smart accessory such as transmission line accessory 102 is present, controller 103 may send an uplink ping message before generating the uplink RF test signal by RF source 104. If there is no received response to the ping message, system equipment 102 may avoid sending the RF test signal down the coaxial cable. This approach may avoid contaminating the RF environment with unintentional transmissions and may be beneficial for passing RF emissions requirements.

Figure 2:
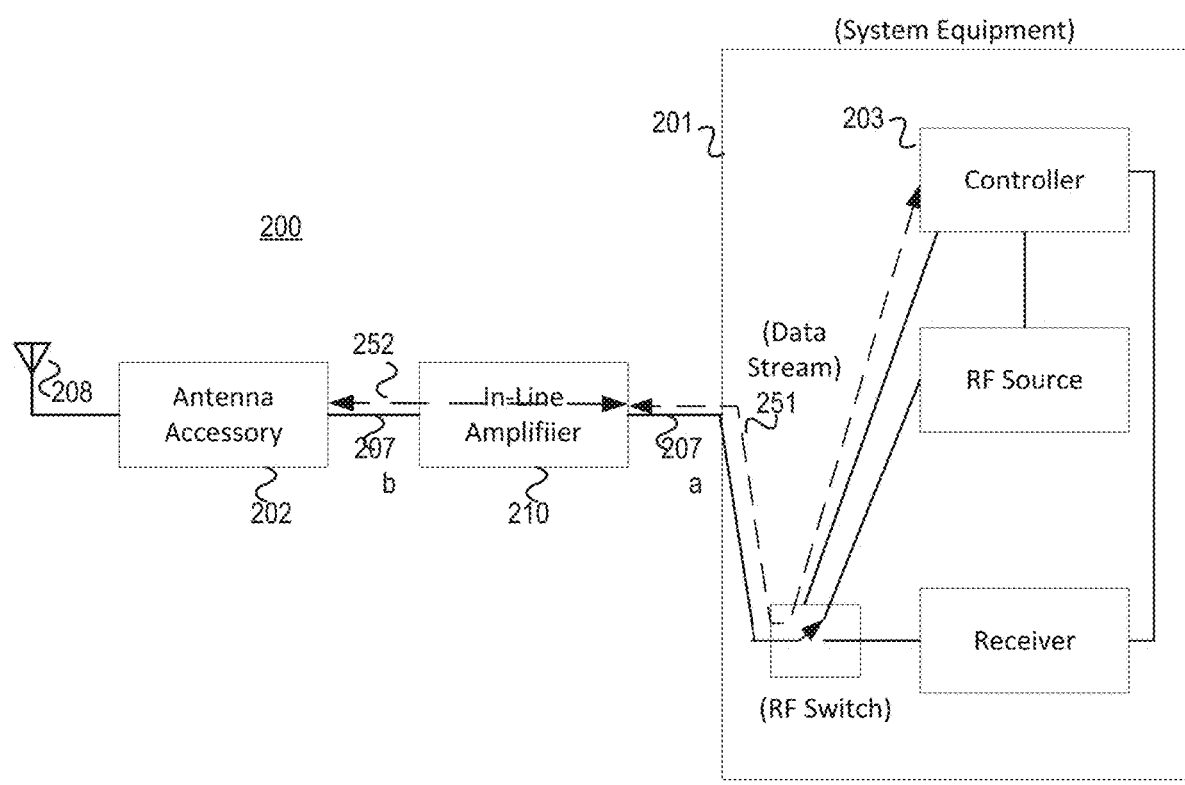
FIG. 2 shows a wireless microphone system where an uplink RF test signal is used to configure a transmission line accessory in accordance with an aspect of the embodiments.

FIG. 2 shows wireless microphone system 200, where an uplink RF test signal is used to configure antenna accessory 202 and in-line amplifier 210 (where antenna accessory 202 is in series with in-line amplifier 210 along transmission line network 207*a* and 207*b*). While both antenna accessory 202 and in-line amplifier 210 are identified as transmission line accessories, an antenna accessory (such as accessory 202) interfaces to antenna 208 and in-line amplifier 210 provides radio frequency RF amplification between antenna accessory 202 and system equipment 201. For example, RF amplification may be needed for long coaxial runs between antenna accessory 202 and system equipment 201.

Figure 3:
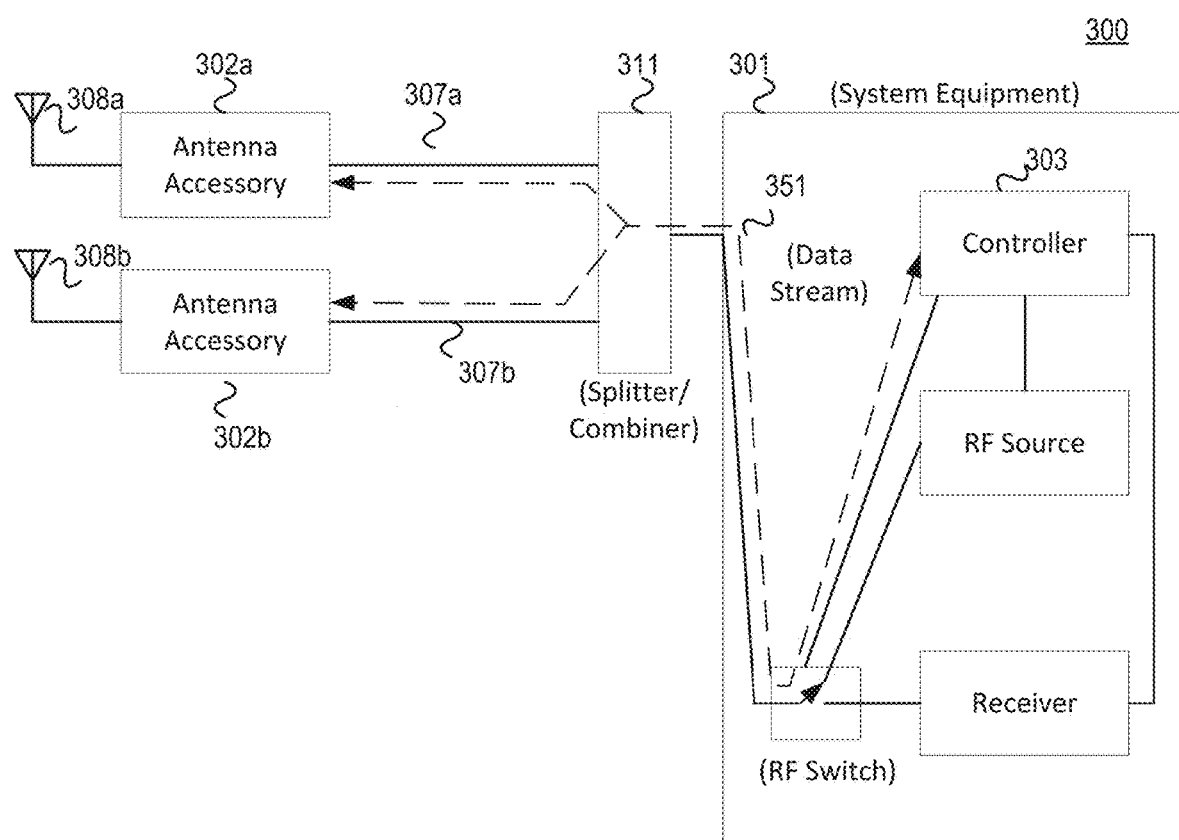
FIG. 3 shows a wireless microphone system where an uplink RF test signal is used to configure a transmission line accessory in accordance with an aspect of the embodiments.

When multiple transmission line accessories are connected in series (for example, as shown in FIG. 2) or in parallel (as shown in FIG. 3 through an RF splitter or RF combiner) in a transmission line network, it may be important for a wireless microphone system to determine the arrangement of accessories. This may be performed by instructing each connected device to modulate the DC level at their input port one at a time. Devices connected upstream (towards to the antenna) detect the modulated DC and return a message over the bidirectional coaxial communication network (for example, via data streams 251 and 252) indicating that they are connected in series with the modulated device. If modulation from one device elicits response from multiple accessories that don't have series connection responses, the response indicates that parallel transmission line accessories are connected upstream of the modulating device. Once the configuration of connected devices is determined, the gain of each device may be adjusted to compensate for the RF losses connecting it to the next downstream device. Configuration information may also be communicated to software applications, thus generating an RF configuration connection map. The map includes gain and filter settings of connected devices. A software application may also determine if filter settings of a connected device are compatible. When used with spectrum manager, RF scanner, or scan data, the software application may automatically select filter options that improves system performance. This approach may allow devices to be operational during system mapping and discovery (as will be discussed).

With some embodiments, discovery signaling (for example, the original discovery message) is passed through accessory 210 to accessory 202 (the next accessory). Each accessory, when asked by controller 203, modulates the DC signal on the transmission line and accessories that detects the DC modulation responds. More than one response may be received, indicating multiple accessories are connected in series or parallel. If no response is received, that accessory must be at the end of the line. In other words, controller 203 broadcasts discovery messages and only the designated accessories respond. With this approach, multiple discovery signals (messages) may be needed to build a mapping of the accessories in the coaxial network by controller 203, where the mapping is indicative of the ordering of the accessories.

With some embodiments, when transmission line accessories are in series with each other (as with accessories 202 and 210), the downstream accessory (for example, accessory 210) may regenerate an upstream message conveyed on the data stream to/from the uplink transmission line accessory (for example, accessory 202). This approach ensures that multiple messages are sent in a sequential fashion on a data stream, thus avoiding message collisions. However, embodiments may use other approaches to avoid message collisions on the data stream. For example, to avoid response collisions accessories 202 and 210 may be instructed to respond to controller 203 after waiting a random delay period or using a delay period algorithm. If collisions do occur, controller 203 may request accessories 203 and 210 to resend messages until all messages are correctly received.

With some embodiments, when transmission line accessories are in series with each other (as with accessories 202 and 210), the downstream accessory (for example, accessory 210) may pass through an upstream message conveyed on the data stream to/from the uplink transmission line accessory (for example, accessory 202).

FIG. 3 shows wireless microphone system 300, where an uplink RF test signal is used to configure transmission line accessories 302*a* and 302*b* in accordance with an aspect of the embodiments. Antennas 308*a* and 308*b* are connected to system equipment 301 through transmission line accessories 302*a* and 302*b*, respectively. Accessories 302*a* and 302*b* are configured in a parallel fashion along transmission line facilities 307*a* and 307*b*, respectively, through RF splitter/combiner 311.

Controller 303 interacts with accessories 302*a* and 302*b* via data stream 351 (which is split by splitter/combiner 311 in the uplink direction and combined in the downlink direction) compensating for RF losses along transmission line network. To avoid response collisions, accessories 302*a* and 302*b* may be instructed to respond to controller 303 after waiting a random delay period or using a delay period algorithm. If collisions occur, controller 303 may request accessories 302*a* and 302*b* to resend messages until all messages are correctly received.

Figure 4:
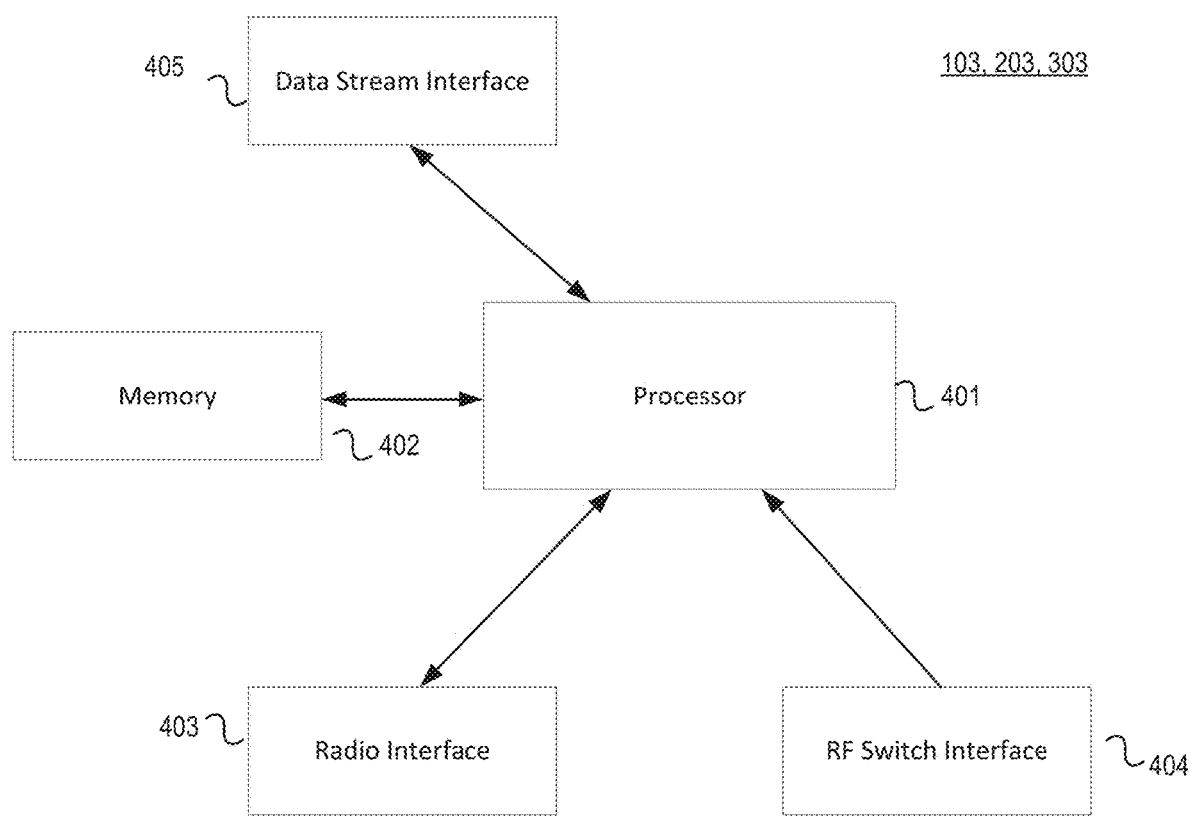
FIG. 4 shows a controller that supports one or more transmission line accessory in accordance with an aspect of the embodiments.

FIG. 4 shows controller 103, 203, 303 that supports one or more transmission line accessories in accordance with an aspect of the embodiments. Controller 103, 203, 303 comprises processor 401, memory device 402, and data interfaces 403-405.

Processor 401 may execute computer executable instructions from a computer-readable medium, such as memory device 402, in order perform processes 500, 900, 1400 shown in FIGS. 5, 9, 14, and 16, respectively.

Controller 103, 203, 303 may include one or more application-specific integrated circuits (ASICs), complex programmable logic devices (CPLDs), field-programmable gate arrays (FPGAs), or other integrated circuits. Computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 401. The executable instructions may carry out any or all of the method steps described herein.

Figure 5:
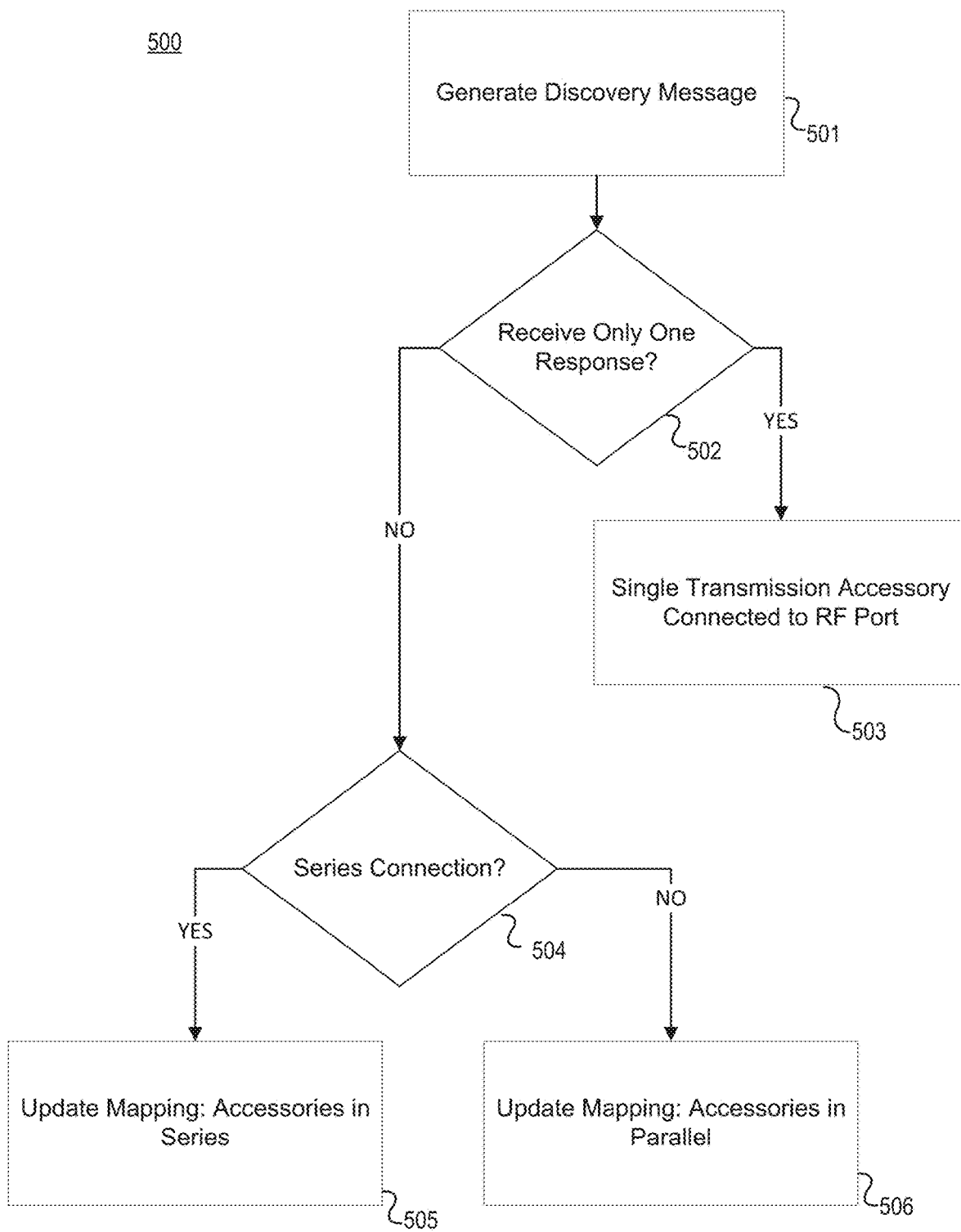
FIG. 5 shows a flowchart for discovering transmission line accessories connected to a transmission line network in accordance with an aspect of the embodiments.

FIG. 5 shows flowchart 500 for discovering transmission line accessories connected to a transmission line network in accordance with an aspect of the embodiments. As shown in FIGS. 1, and 3, each RF port at system equipment 101, 201, and 303 is associated with a group of transmission line accessories. FIG. 1 shows a first accessory group with accessory 102; FIG. 2 shows as a second accessory group with accessories 202 and 210 in series; and FIG. 3 shows a third accessory group with accessories 302 and 310 in parallel.

Controller 103, 203, 303 discovers the accessory configuration for each accessory group by sending a discovery message through an associated RF port at block 501 and receiving discovery responses at block 502.

A discovery message may be implemented in a number of different ways, including, but not limited to, signaling and network messaging. For example, with some embodiments, a discovery message may comprise a DC level change (which may be considered as a 1-bit message) to signal accessories. Some embodiments, may implement a discovery message as a network message, where a destination address may signify a global address when discovering accessories in a transmission line network.

At block 503, if only one discovery response is received through the RF port, only one transmission line accessory is connected to the transmission line network (for example, accessory 101 as shown in FIG. 1).

If multiple discovery responses are received at block 502, multiple transmission line accessories are connected to the transmission line network through the RF port (for example, accessories 202 and 210 as shown in FIG. 2 or accessories 302 and 310 as shown in FIG. 3). To determine whether accessories are in series or in parallel at block 504, when multiple discovery responses are received by controller 103, 203, 303, a response may include a series indicator that is indicative that the responding accessory is in series with a downstream accessory (corresponding to block 505). Otherwise, multiple responses are indicative that parallel accessories are responding (corresponding to block 506).

Figure 15:
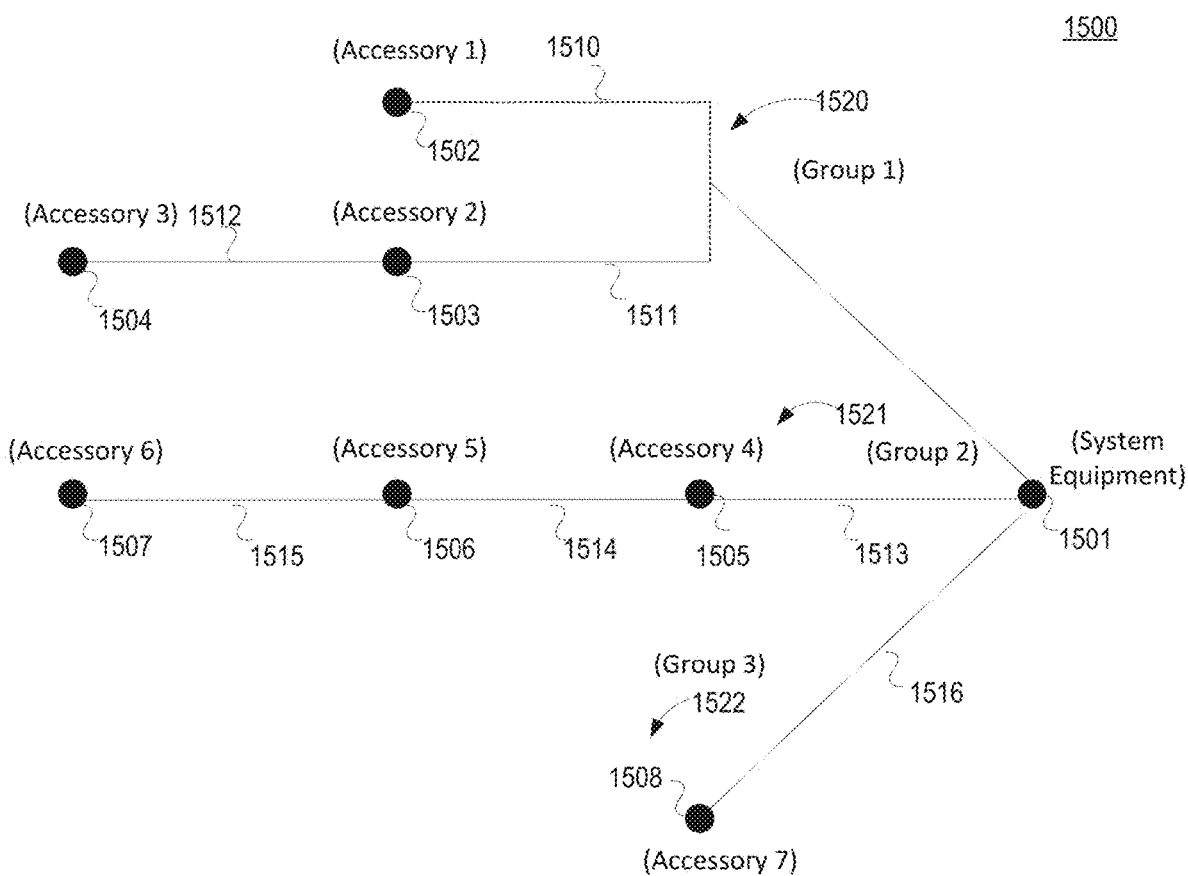
FIG. 15 shows an exemplary graphical representation of a wireless microphone system with a transmission line network and a plurality of transmission line accessories in accordance with an aspect of the embodiments.

Embodiments may also support configurations in which an accessory group includes both accessories that are in series and accessories that in parallel (for example, accessory group 1 as shown in FIG. 15).

Figure 6:
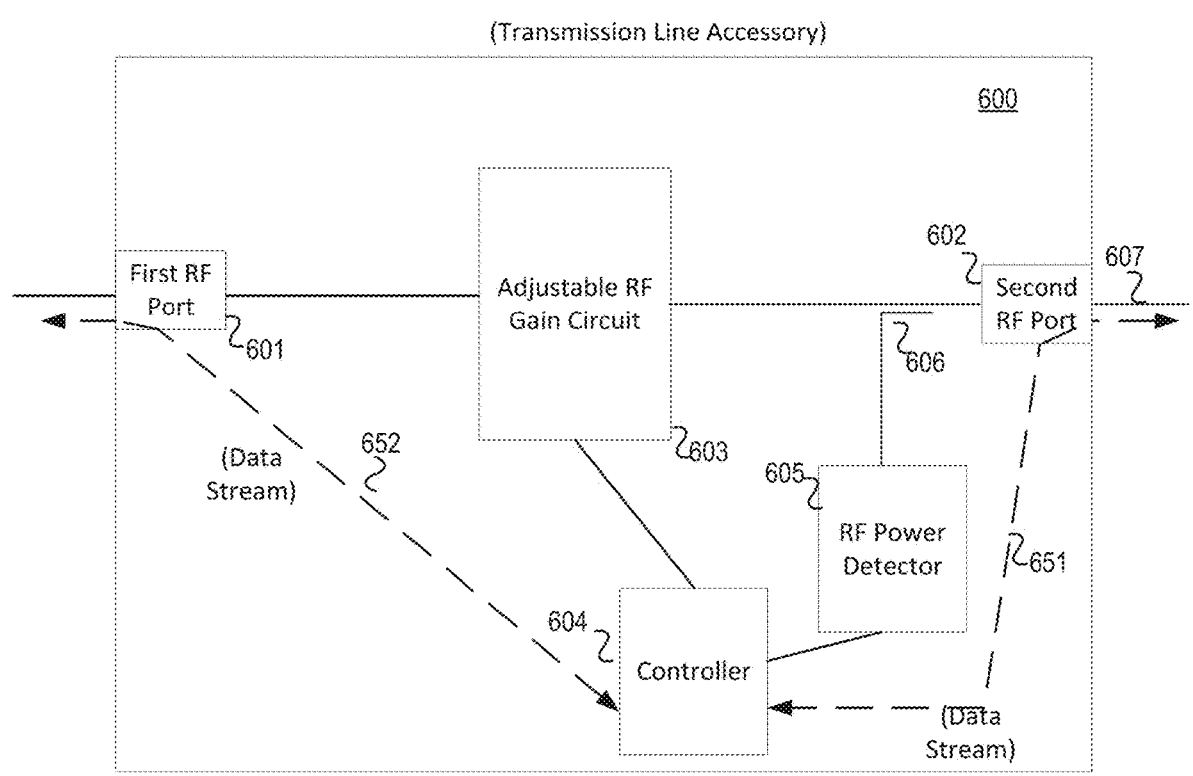
FIG. 6 shows a transmission line accessory in accordance with an aspect of the embodiments.

FIG. 6 shows transmission line accessory 600 in accordance with an aspect of the embodiments. Transmission line accessory 600 includes RF ports 601 and 602, which are toward the antenna and the system equipment, respectively.

For corresponding receiver(s) to operate in a proper manner, the received signal levels presented to the corresponding receiver(s) should be within a specified range. In order to do so, adjustable RF gain circuit 603 is configured with an RF gain setting determined by controller 103, 203, 303 as will be discussed.

Controller 604 interacts with controller 103,203,303 over data stream 651. Consequently, controller 604 may be instructed to measure the received RF power level of the RF test signal (generated by an RF source at the system equipment) through RF power detector 605 and directional coupler 606 and to report the measurement back to controller 103, 203, 303. The measurements may be repeated over a plurality of frequencies in order obtain RF loss characteristics of the transmission line network.

With some embodiments, power detector 605 may comprise an electronic circuit that monitors and/or samples the input signal obtained from directional coupler 606 and generate a dc output voltage related to the RF power of the input signal. Embodiments may utilize different types of power detectors. For example, a log power detector converts the input RF power into a dc voltage proportional to the log of the input signal, where the dc voltage is directly related to decibels. As another example, a rms power detector generates a dc output proportional to the rms value of the input signal.

Data stream 651 may be extended to first RF port 601 through data stream 652 via controller 604 when another transmission line accessory is situated upstream (towards the antenna). Consequently, messaging may be relayed from controller 103,203, 303 to the upstream transmission line accessory.

Figure 7:
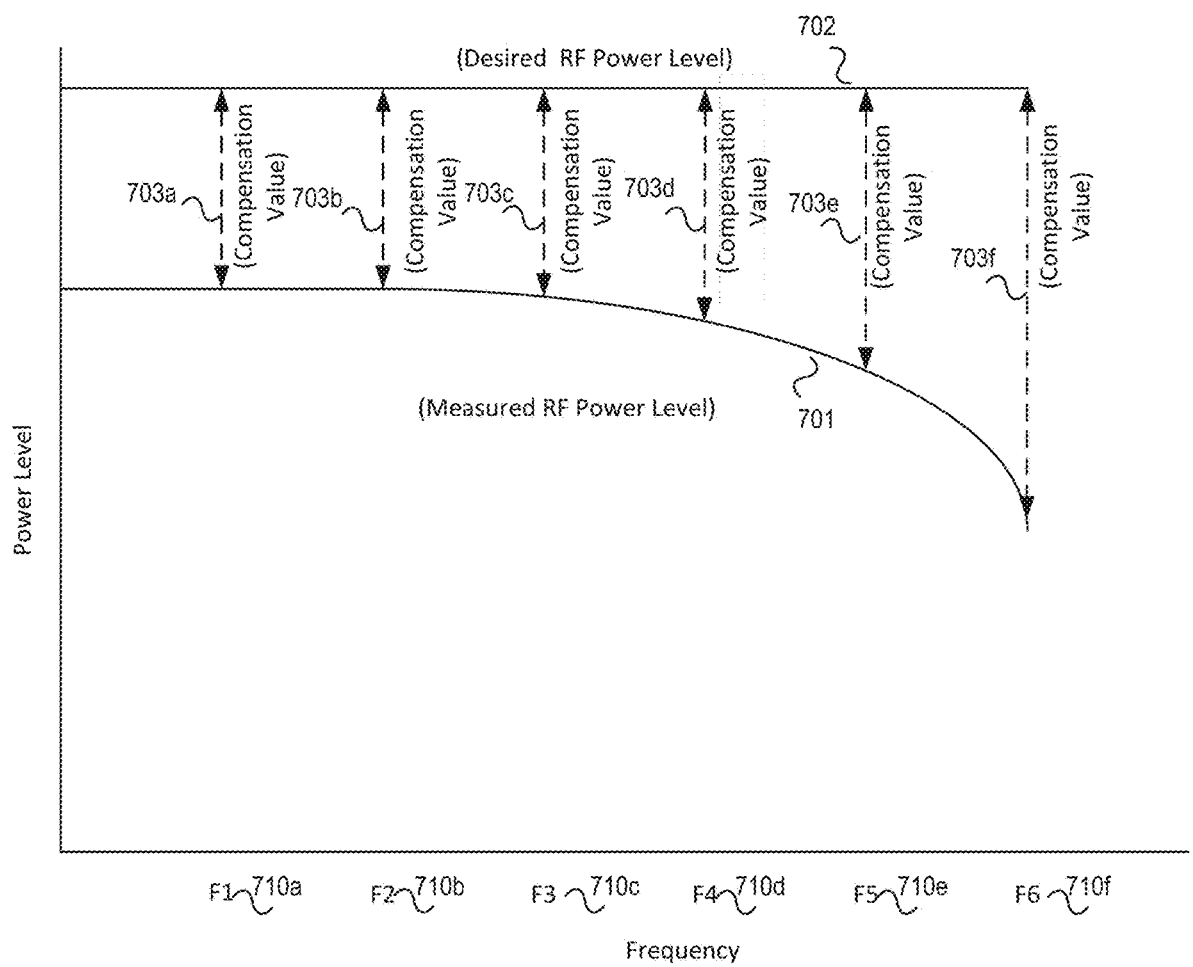
FIG. 7 shows measured RF power level characteristics of a transmission line network between a transmission line accessory and system equipment of a wireless microphone system in accordance with an aspect of the embodiments.

FIG. 7 shows exemplary measured RF power level characteristics 701 of a transmission line network between a transmission line accessory and system equipment of a wireless microphone based on RF power levels obtained through RF power detector 605. In order for the associated receiver in the system equipment to operate within a specified range, desired RF power level 702 is determined. From the difference (compensation values 703a-f) between measured RF power level characteristics 701 and desired RF power level 702 over frequencies 710a-f, controller 103, 203,303 can determine the configuration settings for transmission line accessory 600.

When the operating frequency range is large, the RF loss of the transmission line network may not be constant and may exhibit an RF loss variation. (For example, this issue may be evident when a wireless microphone system supports multiple frequency bands such as 2.4 GHz, 5.5 GHz, 1.8 GHz, and/or 902 MHz.) Consequently, operation of a transmission line accessory may span multiple frequency bands.) The RF loss at frequency 710d is larger than at frequency 710c, which is typical with coaxial cables. Partial compensation of the RF loss variation may be obtained by increasing the RF gain setting of adjustable RF gain circuit 603 (as shown in FIG. 6). For example, the RF gain setting may be determined by an average compensation value or a maximum compensation value over some or all of compensation values 703a-f. However, embodiments may enhance compensation by incorporating a compensation filter as will be further discussed.

Figure 8:
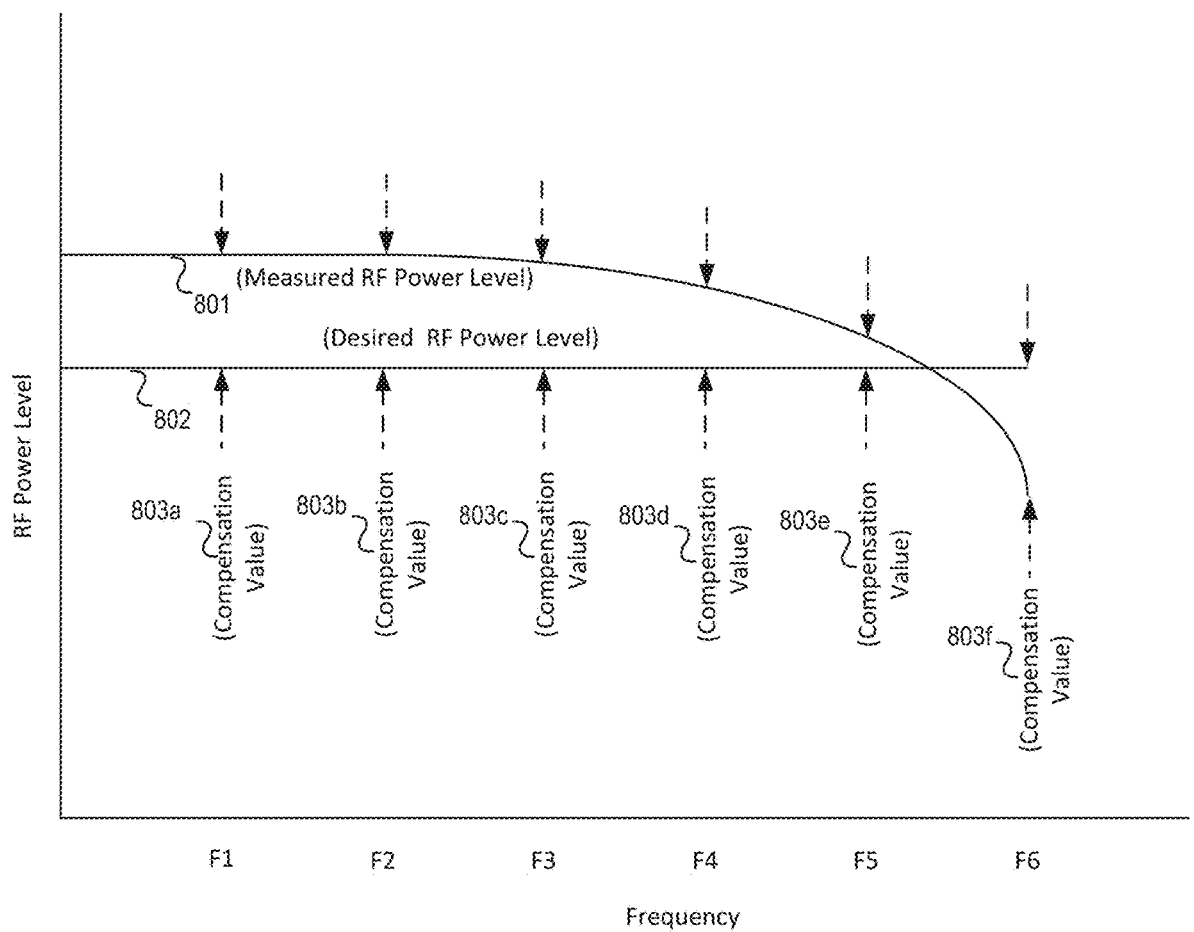
FIG. 8 shows measured RF power level characteristics of a transmission line network between a transmission line accessory and system equipment of a wireless microphone system in accordance with an aspect of the embodiments.

FIG. 8 shows exemplary measured RF power level characteristics 801 and desired RF power level 802. While RF power level characteristics 801 is the same as RF power level characteristics 701 (as shown in FIG. 7), desired RF power level 802 is different. Consequently, compensation values 803a-f are different, thus affecting the RF gain setting of adjustable RF gain circuit 603 (as shown in FIG. 6).

Figure 9:
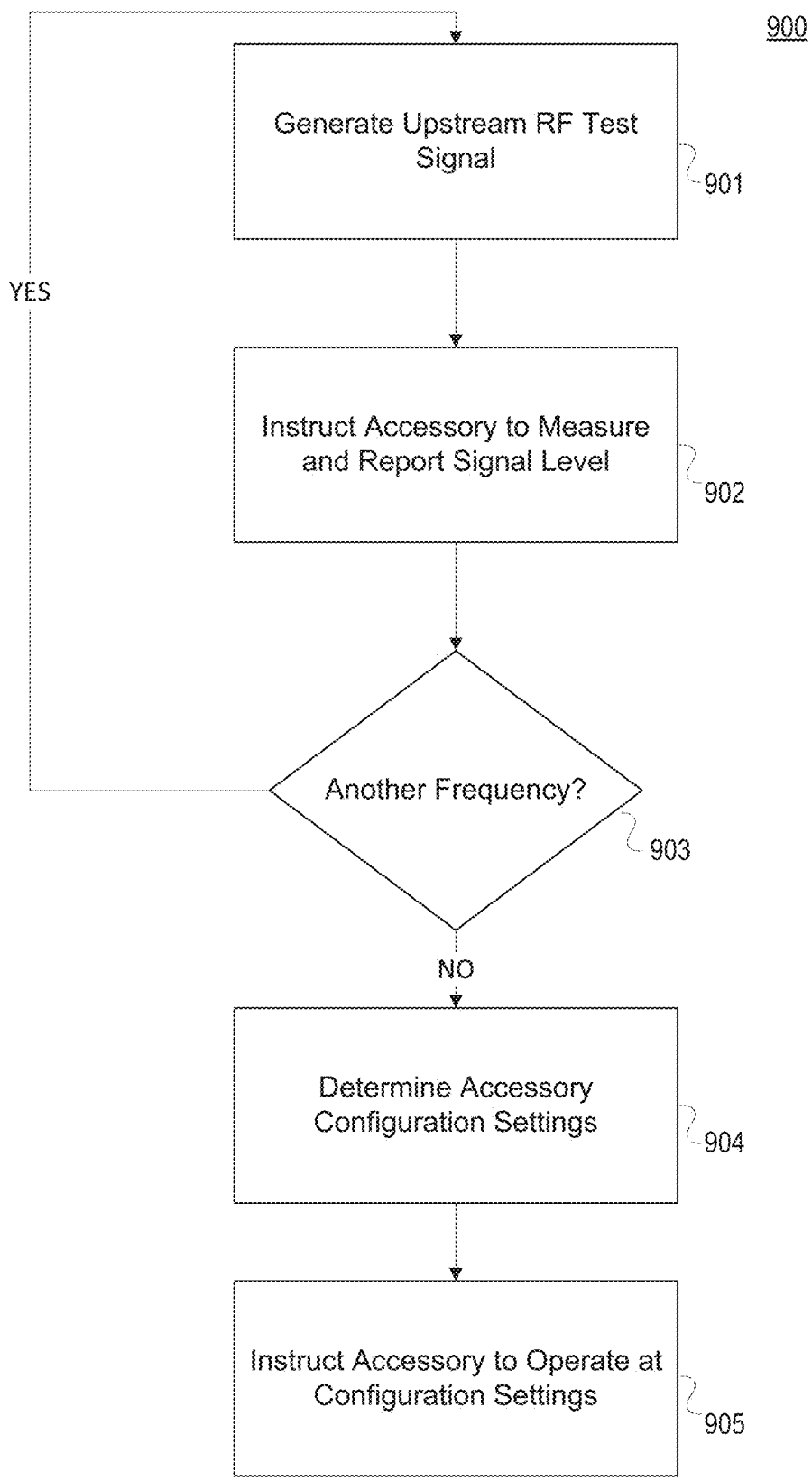
FIG. 9 shows a flowchart for configuring a transmission line accessory by system equipment in a wireless microphone system in accordance with an aspect of the embodiments.

FIG. 9 shows flowchart 900 for configuring a transmission line accessory by system equipment in a wireless microphone system in accordance with an aspect of the embodiments.

At block 901, controller 103,203,303 (as shown in FIGS. 1-3, respectively) initiates generation of an uplink RF test signal by an RF source (for example, 104 as shown in FIG. 104) over a transmission line network to a transmission line accessory, where the uplink RF test signal is established at a given frequency and first RF power level.

At block 902, controller 103,203,303 instructs the transmission line accessory to measure the received RF test signal (second RF power level) and to report the results back. Controller 103,203,303 may repeat blocks 901-902 over a plurality of frequencies (for example, frequencies 710a-f as shown in FIG. 7) at block 903.

At block 904, controller 103,203,303 determines the configuration settings for the transmission line accessory from the measurements. At block 905, controller 103,203, 303 then instructs the transmission line accessory to operate with the determined configuration settings.

Figure 10:
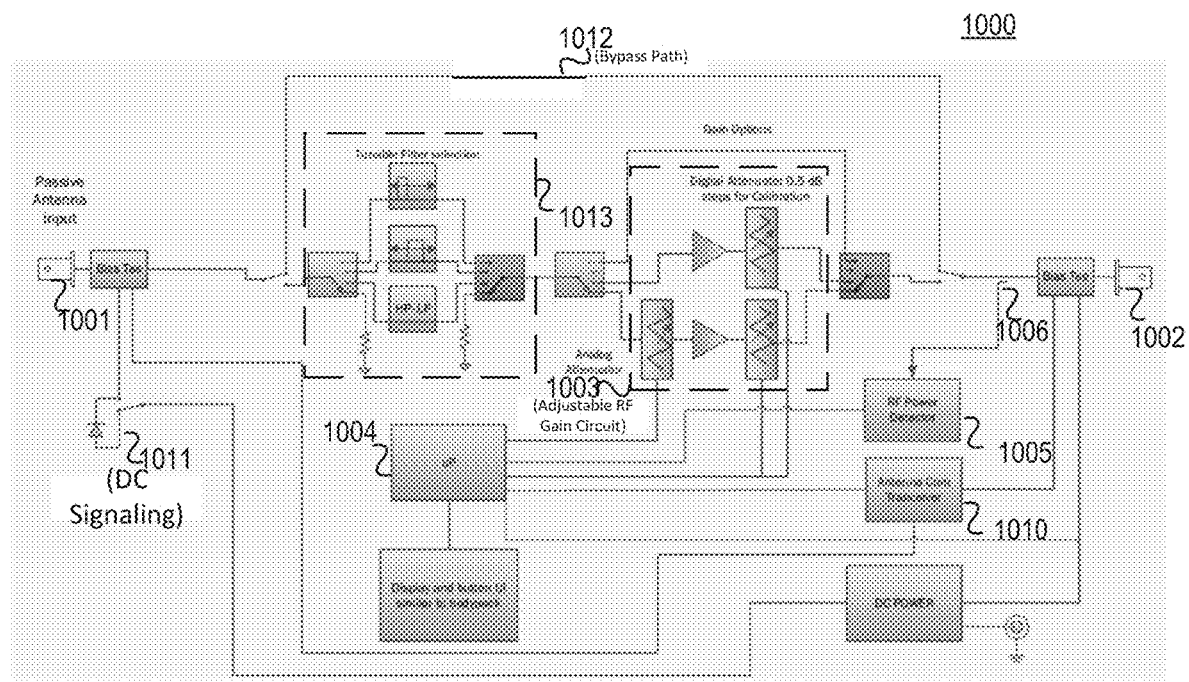
FIG. 10 shows a transmission line accessory in accordance with an aspect of the embodiments.

Process 900 is applicable to situations in which a plurality of transmission line accessories is installed on a transmission line network through a given RF port. For example, referring to FIG. 2, controller 203 first determines the configuration settings for accessory 210 (corresponding to blocks 901-905). Consequently, controller 203 has determined the RF loss characteristics of transmission line segment 207a. Controller 203 may then characterize the next uplink accessory (accessory 202) by activating a bypass path through accessory 210 (for example, bypass path 1012 as shown in FIG. 10) and repeats blocks 901-905 for accessory 202. Controller can then determine the RF loss characteristics of transmission line segment line 207b.

FIG. 10 shows transmission line accessory 1000, where port 1001 connects toward an antenna. Accessory 1000 supports compensation for RF losses on the downlink incurred through the transmission line network between accessory 1000 and a downstream accessory or system equipment by providing an appropriate RF gain (corresponding to an RF gain setting determined by controller 103, 203, 303 according to process 900) with adjustable RF gain circuit 1003.

While adjustable RF gain circuit 1003 may comprise an RF attenuator (as shown in FIG. 10), circuit 1003 may include an adjustable gain amplifier or some other type of active device. Microprocessor 1004 (which corresponds to controller 604 shown in FIG. 6) interacts with controller 103, 203, 303 (as shown in FIGS. 1, 2, and 3, respectively) through communication transceiver 1010 and DC signaling circuit 1011 in order to support bidirectional communication on the data stream.

With some embodiments, communication transceiver 1010 may comprise Texas Instruments SN65HVD62 AISG On-Off Keying Coax Modem Transceiver or other one-wire communication transceivers.

Based on received instructions from controller 103, 203, 303, microprocessor 1004 obtains measurements of the received signal level for an uplink RF test signal received from RF source (such as RF source 104 as shown in FIG. 1) as measured through RF power detector 1005 and directional coupler 1006. The measurements are then reported to controller 103, 203, 303 over the data stream (via communication transceiver 1010).

Transmission line accessory 1000 also comprises bypass path 1012. When activated, adjustable RF gain circuit 1003 and tunable filter 1013 may be circumvented so that system equipment can directly interact with an upstream transmission line accessory.

Figure 11:
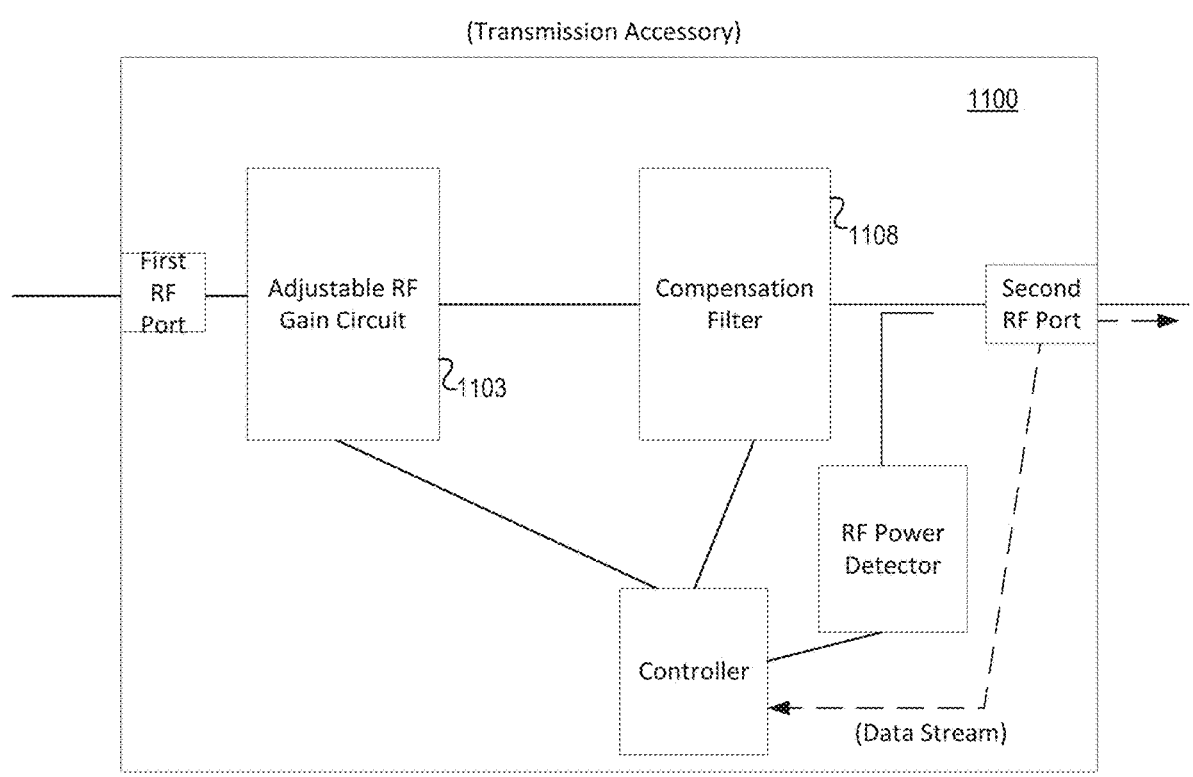
FIG. 11 shows a transmission line accessory with a compensation filter in accordance with an aspect of the embodiments.

Tunable filter 1013 is typically configured to filter unwanted RF signals received through an associated antenna. In order to compensate for a frequency-related RF loss variation incurred on the transmission line network, a compensation filter (for example, filter 1108 as shown in FIG. 11) may be included. However, as previously discussed, the RF gain of adjustable RF gain circuit may partially compensate for the RF loss variation.

FIG. 11 shows transmission line accessory 1100 in accordance with an aspect of the embodiments. While accessory 1100 comprises adjustable RF gain circuit 1103 that is similar to adjustable RF gain circuit 603 as shown in FIG. 6, accessory 1100 also includes compensation filter 1108 to enhance compensation of the RF losses of the transmission line network.

Referring to FIG. 7, measured RF power level 701 (which is the measured values of the RF test signal at the transmission line accessory) comprises a constant RF loss component (which is not frequency dependent) plus an RF loss variation component (which is frequency dependent). For example, the RF loss at frequency 710a comprises only the constant RF loss component while the RF loss at frequency 710e comprises both the constant RF loss component and the RF loss variation component.

Referring back to FIG. 11, embodiments may configure adjustable RF gain circuit 1103 to compensate for the constant RF component and compensation filter 1108 to compensate for the RF loss variation component.

Figure 12:
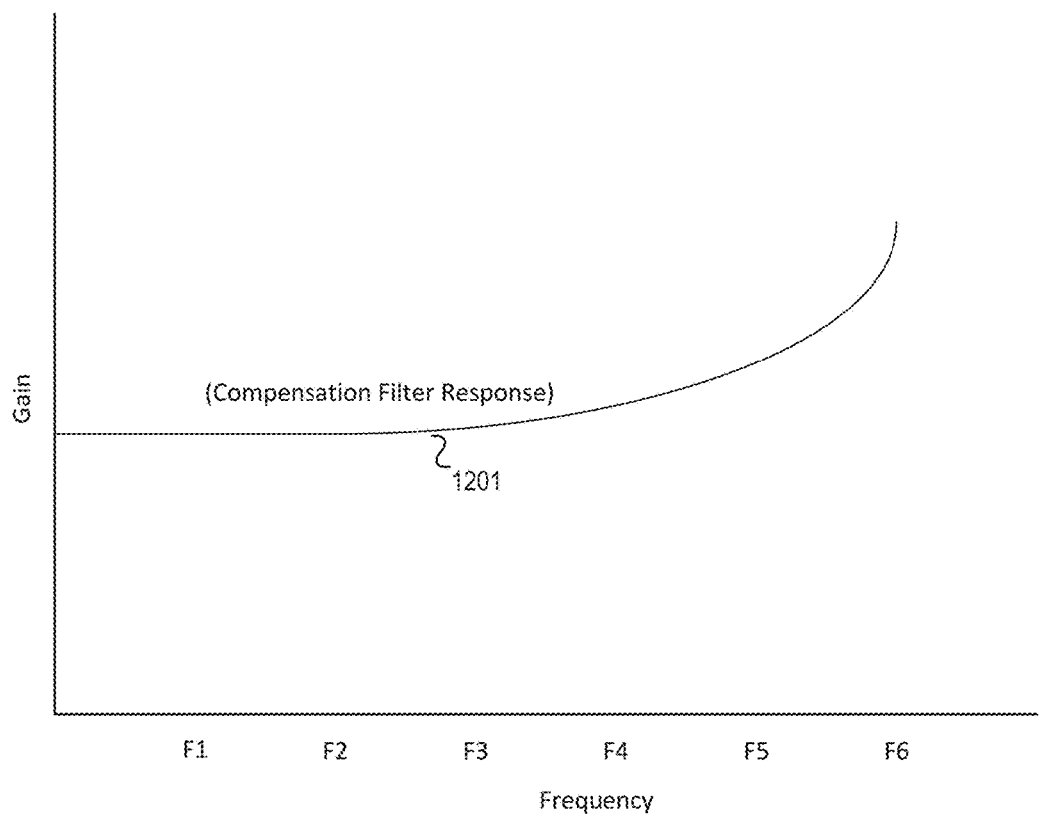
FIG. 12 shows an exemplary compensation filter response for a compensation filter in accordance with an aspect of the embodiments.

FIG. 12 shows an exemplary compensation filter response 1201 for compensation filter 1108 as shown in FIG. 11. Compensation filter 1108 accentuates the higher RF frequencies to compensate for the increased RF losses at higher RF frequencies as shown in FIG. 7.

Figure 13:
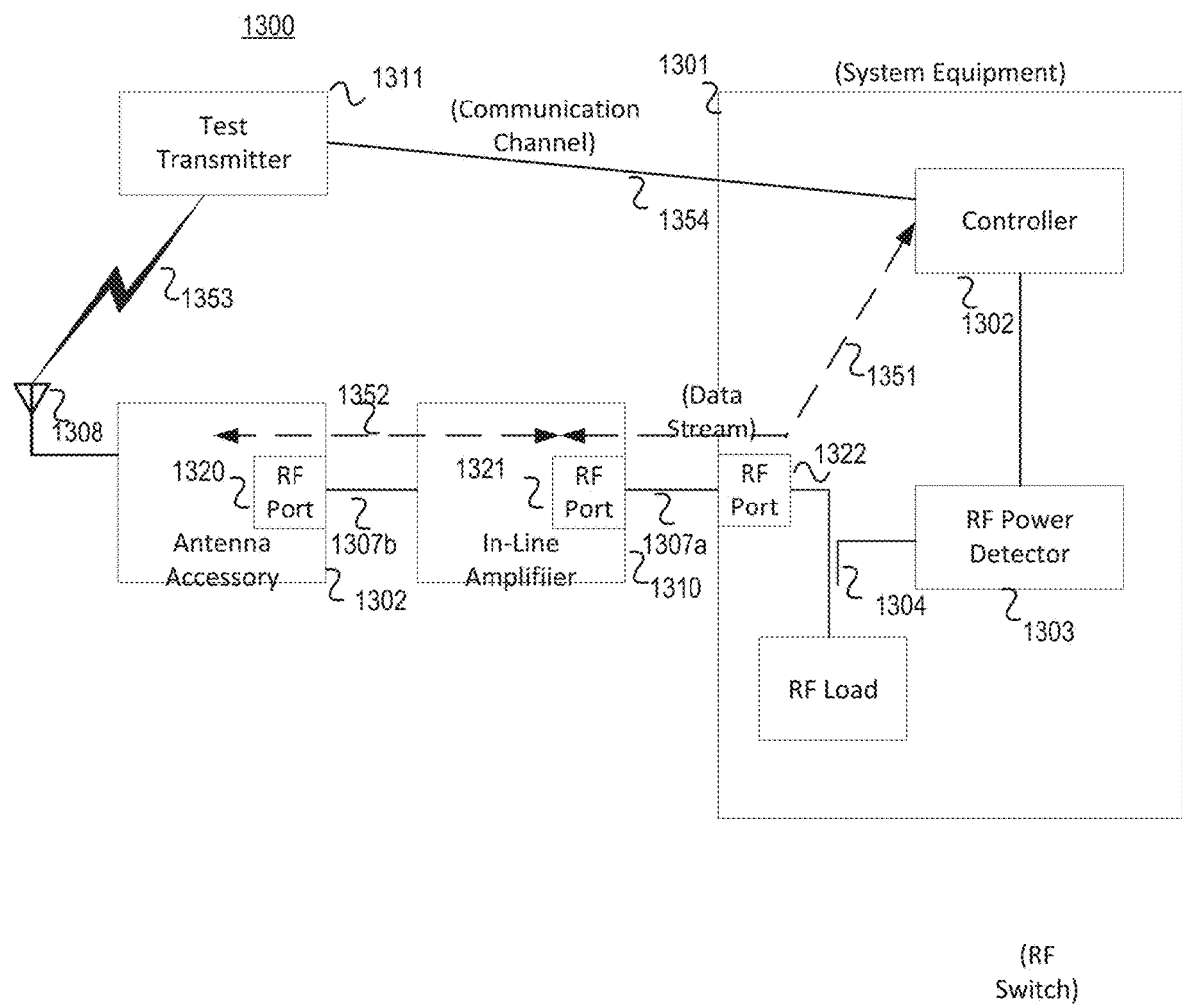
FIG. 13 shows a wireless microphone system where a downlink RF test signal is used to configure a transmission line accessory in accordance with an aspect of the embodiments.

FIG. 13 shows wireless microphone system 1300, where downlink RF test signal 1353 from test transmitter 1311 through antenna 1308 is used to configure a transmission line accessories 1302 and 1310. Test transmitter 1311 is typically stationary (fixed) so that downlink RF test signal 1353 is effectively constant. With some embodiments, test transmitter 1311 may support a plurality of frequencies.

With some embodiments, the RF source for gain measurement may originate from an external source such as a wireless microphone or an in-band TV transmitter. The RF power measured at the antenna's power detector may then be reported to the rack-mounted device as the reference power level. RF power in downstream nodes are then compared to RF power at the antenna or upstream nodes. The difference in the measured RF power is the loss between the measurement nodes. Optionally, a calibrated RF source may reside in each node device and turned on one at a time during the cable loss calibration process.

Referring to FIG. 13, while wireless microphone system 100 (as shown in FIG. 1) generates an RF test signal in the uplink (towards the antenna), wireless microphone system 1300 utilizes an RF signal generated by test transmitter 1311 in the downlink (towards the system equipment) that is controlled through communication channel 1354.

With some embodiments, test transmitter 1311 comprises a Shure Incorporated AD2 handheld Wireless Microphone Transmitter (equipped with a Shure Incorporated Show-Link™ transceiver) that is controlled through another Shure Incorporated ShowLink transmitter that interfaces to the system equipment. A software application directs the Show-Link transceiver to affect a frequency change on the AD2 transmitter (test transmitter 1311). However, the power level provided by AD2 transmitter does not need to be known because the RF losses along transmission line network 1307a,1307b can be determined by comparing the RF power levels at accessory ports 1320 and 1321 and at the system equipment port 1322. The RF power level at port 1322 is obtained by RF power detector 1303 and directional coupler 1304 and operates in a similar fashion as with measurements obtained at the accessories.

With some embodiments, a Shure Incorporated Axient® digital transmitter may be equipped with a ShowLink transceiver, which may be connected to rack equipment over an ethernet. If the computer or rack equipment wants to change the frequency setting of the transmitter, a command is sent to the ShowLink transceiver and is relayed over a Zigbee channel to the transmitter. The transmitter may also send acknowledgments back to the ShowLink transceiver and then back to the rack equipment via the ethernet.

When RF test signal 1353 has been established at a desired frequency, the RF signal levels is measured at each accessory (antenna accessory 1302 and in-line accessory 1310) as instructed by controller 1302 through data stream 1351,1352 and at the system equipment. Consequently, the RF loss for transmission line segments 1307b and 1307a can be determined from the differences between measured power levels at ports 1320 and 1321 and at ports 1321 and 1322, respectively. Measurements at each accessory may be facilitated by activating a bypass path (for example, bypass path 1012 as shown in FIG. 10).

With some embodiments, after each frequency change the accessory power detectors may measure RF power and report measurements to a distribution amplifier (system equipment). The cable loss at each frequency may be calculated, stored or made available to the other networked components. The accessories may then be instructed to compensate for the loss that matches the desired frequency of operation. After the calibration procedure, the test transmitter (for example, the AD2 transmitter) may be instructed to return to normal operation.

Figure 14:
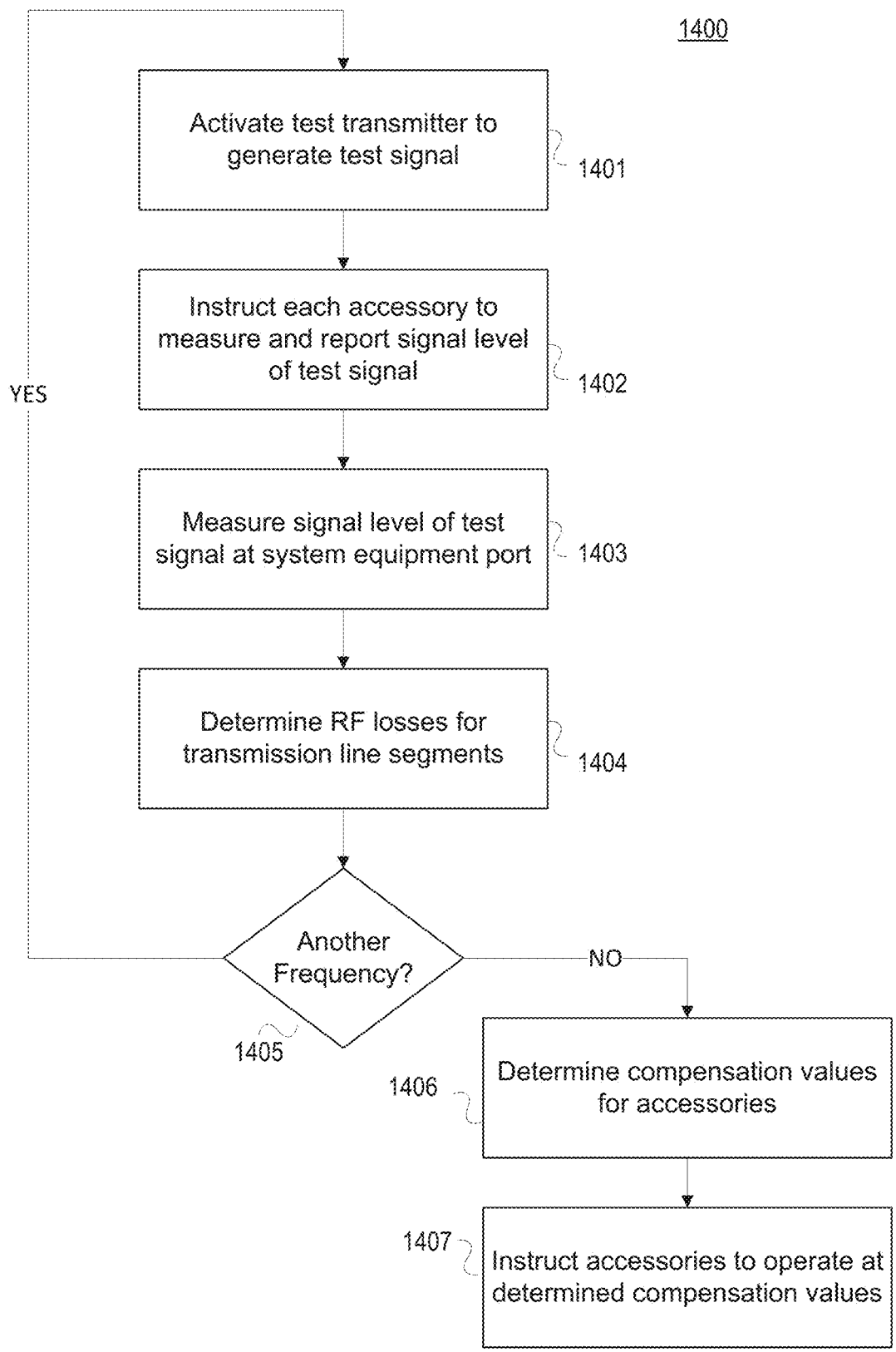
FIG. 14 shows a flowchart for configuring transmission line accessories by a wireless microphone system in accordance with an aspect of the embodiments.

FIG. 14 shows flowchart 1400 for configuring transmission line accessories that incorporates the above approach. At block 1401 test transmitter 1311 is activated via communication channel 1354 to generate an RF test signal at a desired frequency.

At block 1402 controller 1302 instructs each accessory to measure and report the RF signal level at its port through data stream 1351,1352. (Controller 1302 may activate a bypass path in an accessory when the accessory is measuring the RF signal level.) Controller 1302 also obtains the measured RF signal level at port 1322 from power level detector 1303 at block 1403.

At block 1404 controller 1302 determines the RF loss on transmission segments between RF ports (for example, transmission line segment 1307b between ports 1320 and 1321).

At block 1405 controller 1302 determines whether blocks 1401-1404 should be repeated for another frequency. When all of the measurements have been obtained, the compensation values (for example, RF gain setting and/or filter compensation) are determined and sent to the accessories via the data stream at blocks 1406 and 1407.

FIG. 15 shows exemplary graphical representation (accessory mapping) 1500 of a wireless microphone system with a transmission line network and a plurality of transmission line accessories in accordance with an aspect of the embodiments.

As depicted in exemplary graphical representation 1500, nodes 1501-1508 represent the system equipment and connected accessories through RF ports (not explicitly shown) and line segments 1510-1516 represent transmission line segments between the accessories. The system equipment may discover the accessories using the discovery procedure previously discussed.

Graphical representation 1500 includes accessory groups 1520-1522. Groups 1520, 1521, and 1522 include accessories both in series and parallel and in series only as well as only a single accessory, respectively.

Line segments 1510-1516 may be indicative of the transmission line length of the corresponding transmission line segments. For example, the transmission length may be represented by a number associated with line segments 1510-1516 or by the displayed length of line segments 1510-1516.

The transmission length (distance) may be determined by the measured RF loss when transmission characteristics are known. The distance of a transmission line segment may be determined from the cable type and the RF loss incurred for the transmission line segment. For example, RG-213 has a nominal RF loss of approximately 7 dB, 10 dB, 12 dB, and 21 dB per 100 feet at 902 MHz, 1.8 GHz, 2.4 GHz, and 5.5 GHz, respectively.

Figure 16:
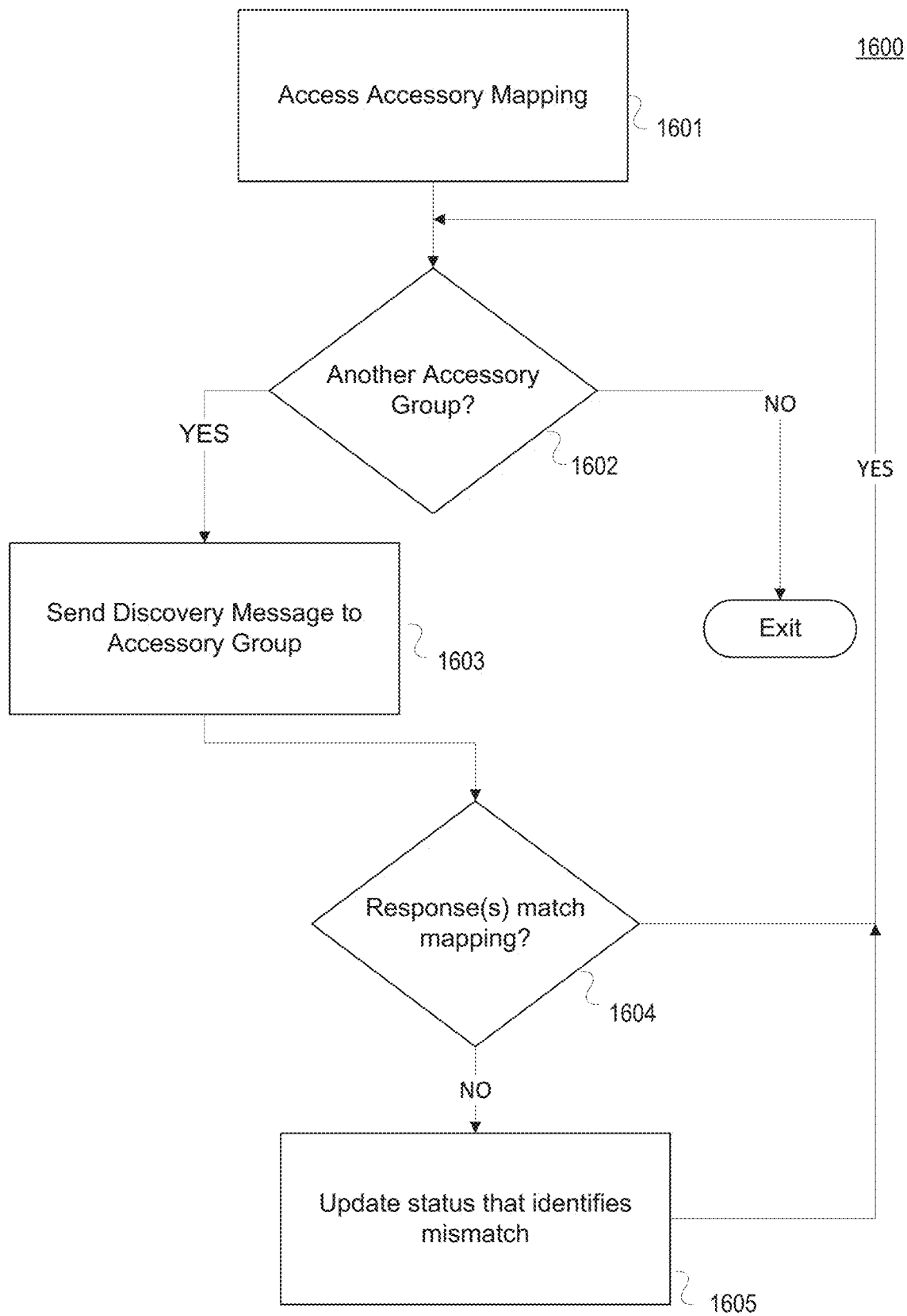
FIG. 16 shows a flowchart for verifying a status of one or more transmission lines accessories and a transmission line network in accordance with an aspect of the embodiments.

FIG. 16 shows flowchart 1600 for verifying a status of one or more transmission lines accessories and a transmission line network in accordance with an aspect of the embodiments. The accessory mapping may be known from the installation or may be subsequently discovered through a discovery process. The mapping may then be represented in a data structure that may be later accessed.

During subsequent operation of a wireless microphone system, coaxial cables to transmission line accessories may be reconfigured or broken. Consequently, it may be advantageous to verify the accessory mapping at appropriate times, for example, by executing process 1600.

Controller 103,203,303 may utilize discovery messages that were previously discussed in order to verify the accessory mapping of a wireless microphone network.

At block 1601, controller 102,203, 303 accesses a data structure that is indicative of the accessory groups (where each group corresponds to an RF port at the system equipment) of a wireless microphone network. In accordance with block 1602, controller 103,203,303 sends a discovery message to an accessory group via the data stream at block 1603. Controller 103,203,303 receives responses from accessories currently connected to the transmission line network at block 1604. Controller 103,203,303 then matches to responses with the accessory mapping at block 1604 and updates the status (for example, with graphical representation 1500) when a mismatch occurs at block 1605 (for example, when an accessory that is not in the mapping responds or when an accessory that is in the mapping does not respond).

While some embodiments may support a transmission line network having only coaxial cables, some embodiments may support transmission line networks having both coaxial cable and optical fiber. For example, a transmission line network of a wireless microphone system may have a long common transmission path that is supported with an optical fiber as well as extending transmission paths that are supported with coaxial cables.

Figure 17:
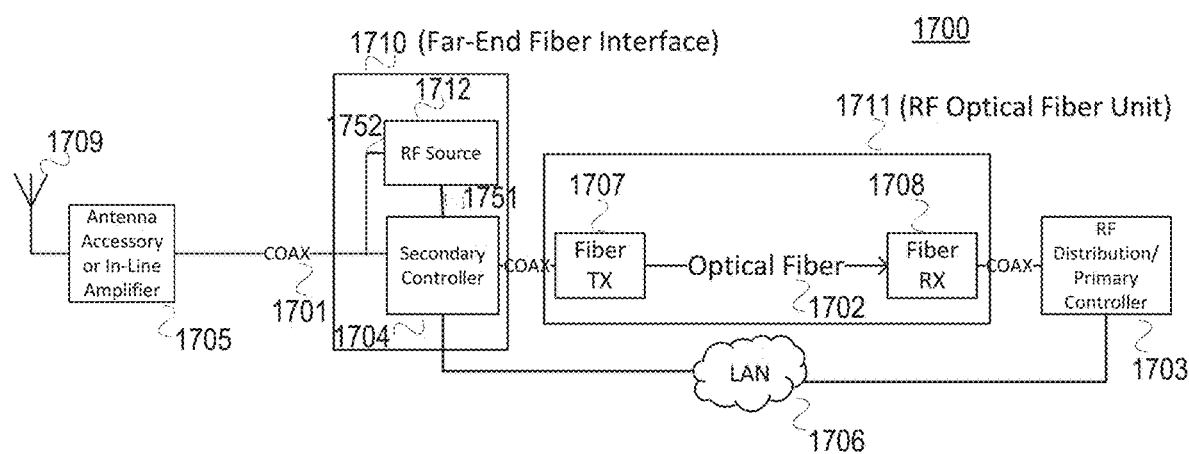
FIG. 17 shows a wireless microphone system having a transmission line network comprising coaxial cable and optical fiber in accordance with an aspect of the embodiments.
Figure 18:
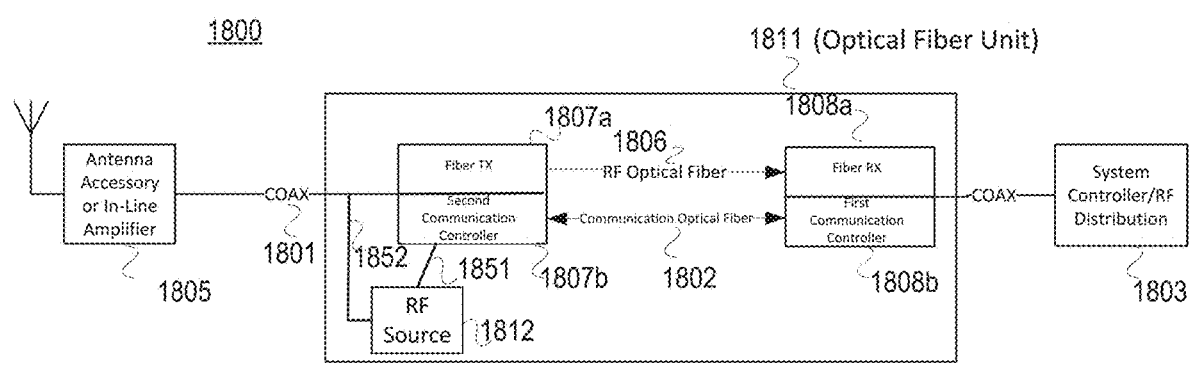
FIG. 18 shows a wireless microphone system having a transmission line network comprising coaxial cable and optical fiber in accordance with an aspect of the embodiments.

Referring to FIGS. 17 and 18, optical fiber 1702 and RF optical fiber 1806 are bidirectional media with typically insignificant transmission losses for transmission lengths used in wireless microphone systems. With some embodiments, systems 1700 and 1800 may support unidirectional transmission from fiber TX (optical transmitter) 1707 to fiber RX (optical receiver) 1708 and from fiber TX (optical transmitter) 1807 to fiber RX (optical receiver) 1808 (corresponding to the downlink direction of optical fiber 1702 and RF optical fiber 1806, respectively) in order to reduce component costs for interfacing with optical fiber. (However, with some embodiments, optical transmitters and receivers may be supported at both ends of the optical fiber medium to support bidirectional operation.)

FIG. 17 shows wireless microphone system 1700 having a transmission line network comprising coaxial cable 1701 and optical fiber 1702 (which is supported within RF optical fiber (RFOF) unit 1711, where RFOF unit 1711 comprises fiber TX 1707, optical fiber 1702, and fiber RX 1708). Wireless microphone system 1700 interfaces with optical fiber 1702 via far-end fiber interface 1710 at the far-end.

Coaxial cable 1701 (the far side antenna to controller connection) is shown as a single line to antenna 1709 via accessory 1705 but may be any combination of series and parallel connections supported by secondary controller 1704. With system 1700 only RF losses upstream of secondary controller 1704 are managed. Some management of coaxial cable 1701 and RFOF unit 1711 may be performed with a reference RF source 1712 at the far-end such as a repurposed transmitter or housed in secondary controller 1704 itself such that an RF signal may be fed into the fiber TX 1707.

Because RFOF unit 1711 is typically unidirectional, secondary controller 1704 is located at the far-end (antenna) of the optical fiber 1702. Secondary controller 1704 may be connected to a near-side controller and/or computer (for example, primary controller 1703) via a control channel supported by local area network 1706. Consequently, primary controller 1703, in concert with secondary controller 1704 through the control channel, is able to adjust the RF gain of accessory 1705 as previously discussed.

In order to determine an adjustable RF gain of antenna accessory 1705, RF source 1712 generates an uplink RF signal through RF link 1752 at first RF power level as instructed by secondary controller 1704 via control link 1751. Antenna accessory 1705 reports back the measured second RF power level to secondary controller 1704.

FIG. 18 shows wireless microphone system 1800 having a transmission line network comprising coaxial cable 1801 and optical RF optical fiber 1806. Optical fiber unit 1811 comprises RF fiber 1802, communication optical fiber 1806, fiber TX 1807*a*, second communication controller 1807*b*, fiber RX 1808*a*, and first communication controller 1808*b*. RF optical fiber 1802 supports unidirectional RF communication from wireless microphones to wireless microphone distribution unit 1803. Because communication fiber 1806 is bidirectional, control of accessory 1805 may be consolidated at system controller 1803, which may be located at rack-mounted system equipment.

Fiber TX 1807*a*, communication controller 1807*b*, fiber RX 1808*a*, and communication controller 1808*b* may have copper to fiber conversion abilities for the signals of interest and also allow the passing of the communication protocol via any number of methods available (wide bandwidth, wavelength multiplexing, multi strand, parallel copper, and so forth). Fiber TX 1807*a*, communication controller 1807*b*, fiber RX 1808*a*, and communication controller 1808*b* may allow for full management of all connections and cable runs including optical fiber unit 1811 with a common communication protocol. Also, the fiber cabling may have provisions for DC power alongside the fiber.

In order to determine an adjustable RF gain of antenna accessory 1805, RF source 1812 generates an uplink RF signal through RF link 1852 at a first RF power level as instructed by second communication controller 1807*b* (in concert with first communication controller 1808*b* and system controller 1803) via control link 1751. Antenna accessory 1805 reports back the measured second RF power level to system controller 1803 via second and first communication controllers 1807*b* and 1808*b*.

With some embodiments, system 1800 comprises an optical fiber cable that includes communication optical fiber 1802 and RF optical fiber 1806.

With some embodiments, a single optical fiber may support the functionality of communication optical fiber 1802 and RF optical fiber 1806 by multiplexing control information and RF information together on the single optical fiber.

Various aspects described herein may be embodied as a method, an apparatus, or as computer-executable instructions stored on one or more non-transitory and/or tangible computer-readable media. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (for example, air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

Exemplary Clauses

1. A wireless microphone system comprising:
    system equipment further comprising: a processing device, a receiver, and a radio frequency (RF) source;
    a first transmission line accessory further comprising an RF power detector and a first adjustable RF gain circuit;
    a transmission line network electrically connecting the system equipment and the first transmission line accessory, wherein the receiver is configured to receive a downlink RF signal from a wireless microphone through the first transmission line accessory over a communication path provided by the transmission line network;
    the RF source configured to generate an uplink RF test signal at a first RF power level to the first transmission line accessory through the communication path;
    the first transmission line accessory configured to measure a second RF power level of the uplink RF test signal received at the first transmission line accessory and configured to report the second RF power level to the processing device;
    the processing device configured to determine an RF gain setting for the first adjustable RF gain circuit from the first and second RF levels and configured to send first configuration information indicative of the RF gain setting to the first transmission line accessory; and
    the first transmission line accessory configured to receive the first configuration information and configured to adjust the first adjustable RF gain circuit, wherein the first adjustable RF gain circuit compensates for a first RF loss incurred on a downlink of the communication path provided by the transmission line network.

2. The wireless microphone system of clause 1, wherein:
the RF source is configured to vary the uplink RF test signal over a plurality of frequencies through the communication path;
the first transmission line accessory is configured to measure the uplink RF test signal over the plurality of frequencies and report frequency-dependent information to the system equipment, wherein the frequency-dependent information is indicative of an RF loss variation through the transmission line network over the plurality of frequencies; and
the processing device configured to modify the first configuration information based on the RF loss variation.

3. The wireless microphone system of clause 2, wherein the processing device adjusts the rf Gain Setting of the Transmission Line Accessory Based on the RF Loss Variation.

4. The wireless microphone system of clause 2, wherein the first transmission line accessory comprises a compensation filter, wherein the first configuration information includes filter compensation information, and wherein the first transmission line accessory configures the compensation filter based on the filter compensation information.

5. The Wireless Microphone System of Clause 1, Wherein:
the system equipment is configured to send a discovery message over the communication path through the transmission line network;
when the first transmission line accessory receives the discovery message, the first transmission line accessory sends a first response over the communication path to the processing device, wherein the first response is indicative that the first transmission line accessory is electrically connected to the transmission line network; and
the processing device updating mapping information about the first transmission line accessory over the transmission line network.

6. The Wireless Microphone System of Clause 5, Comprising:
a second transmission line accessory, wherein the second transmission line accessory is configured in a series arrangement with the first transmission line accessory and is located further from the system equipment than the first transmission line accessory over the transmission line network;
the first transmission line accessory generates a discovery message to the second transmission line accessory;
when the second transmission line accessory receives the discovery message, the second transmission line accessory sends a second response over the communication path to the processing device, wherein the second response is indicative that the second transmission line accessory is electrically connected to the transmission line network and that the second transmission line accessory is in series with the first transmission line accessory; and
the processing device updating the mapping information about the second transmission line accessory over the transmission line network.

7. The Wireless Microphone System of Clause 6, Wherein the RF source is configured to generate the uplink RF test signal at a third RF power level to the second transmission line accessory through the communication path via the first transmission line accessory;
the second transmission line accessory is configured to measure a fourth RF power level of the uplink RF test signal received at the second transmission line accessory and configured to report the fourth RF power level to the processing device;
the processing device configured to determine a second RF gain setting for a second adjustable RF gain circuit from the third and fourth RF levels and configured to send second configuration information indicative of the second RF gain setting to the second transmission line accessory; and
the second transmission line accessory configured to receive the second configuration information and configured to adjust the second adjustable RF gain circuit, wherein the second adjustable RF gain circuit compensates for a second RF loss incurred through the communication path provided by the transmission line network between the first and second transmission line accessories.

8. The Wireless Microphone System of Clause 5, Comprising:
a third transmission line accessory, wherein the third transmission line accessory is parallel to the first transmission line accessory on the transmission line network; and
when the third transmission line accessory receives the discovery message, the third transmission line accessory sending a third response over the communication path to the processing device, wherein the third response is indicative that the third transmission line accessory is electrically connected to the transmission line network; and
the processing device updating mapping information about the third transmission line accessory over the transmission line network.

9. The Wireless Microphone System of Clause 1, Wherein the First Adjustable RF Gain Circuit Comprises an RF Attenuator.

10. The wireless microphone system of clause 1, wherein the first adjustable RF gain circuit comprises an adjustable gain amplifier.

11. The wireless microphone system of clause 1, wherein the system equipment comprises a signaling data circuit, wherein the signaling data circuit is configured to generate a data stream over the communication path, and wherein the data stream conveys messages to instruct the first transmission line accessory to measure and report measurements and to send the first configuration information to the first transmission line accessory.

12. The Wireless Microphone System of Clause 1, Wherein a Portion of the Transmission Line Network Comprises a Coaxial Cable.

13. A Method for Supporting a Wireless Microphone System, the Wireless Microphone System Comprising System Equipment Electrically Connected to a First Transmission Line Accessory Through a Transmission Line Network, the Method Comprising:
generating, by the system equipment, an uplink RF test signal to the first transmission line accessory at a first RF power level and a first frequency over a communication path provided by the transmission line network;
instructing, the first transmission line accessory by the system equipment, to measure a first measured RF power level of the uplink RF test signal at the first transmission line accessory;

in response to the instructing, receiving by the system equipment, first measurement information indicative of the first measured RF power level;

determining, by the system equipment, a first RF gain setting for a first adjustable RF gain circuit at the first transmission line accessory based on the first RF power level and the first measured RF power level; and in response to the determining, instructing, the first transmission line accessory by the system equipment, to adjust the first adjustable RF gain circuit in accordance with the first RF gain setting, wherein first RF gain setting compensates for a first RF loss through a downlink of the communication path.

14. The Method of Clause 13 Further Comprising:
repeating the generating, the instructing, and the receiving over a plurality of frequencies;
obtaining a frequency compensation value from a plurality of measurements over the plurality of frequencies; and
modifying the first RF gain setting based on the frequency compensation value.

15. The Method of Clause 14 Further Comprising:
obtaining the frequency compensation value by averaging the plurality of measurements.

16. The Method of Clause 14 Further Comprising:
obtaining the frequency compensation value from a maximum of the plurality of measurements.

17. The method of clause 13, wherein the wireless microphone system comprises a second transmission line accessory in series to the first transmission line accessory along the transmission line network, further comprising:
sending, by the system equipment, a first discovery message over the communication path through the transmission line network;
receiving, from the first transmission line accessory, a first response over the communication path, wherein the first response is indicative that the first transmission line accessory is electrically connected to the transmission line network; and
receiving, from a second transmission line accessory, a second response over the communication path, wherein the second response is indicative that the second transmission line accessory is serially connected to the first transmission line accessory along the transmission line network.

18. The Method of Clause 17, Further Comprising:
generating, by the system equipment, an uplink RF test signal to the first transmission line accessory at the first RF power level and a first frequency over a communication path provided by the transmission line network;
instructing, the first transmission line accessory by the system equipment, to establish a bypass path between RF ports of the first transmission line accessory;
instructing, the second transmission line accessory by the system equipment, to measure a second measured RF power level of the uplink RF test signal at the second transmission line accessory;
in response to the instructing, receiving by the system equipment, second measurement information indicative of the second measured RF power level;
determining, by the system equipment, a second RF gain setting for a second adjustable RF gain circuit at the second transmission line accessory; and
in response to the determining, instructing, by the system equipment, the second transmission line accessory to adjust the second adjustable RF gain circuit in accordance with the second RF gain setting, wherein second RF gain setting compensates for a second RF loss through a downlink of the communication path between the first transmission line accessory and the second transmission line accessory.

19. The Method of Clause 13, Wherein the Wireless Microphone System Comprises a Third Transmission Line Accessory in Parallel to the First Transmission Line Accessory Along the Transmission Line Network, Further Comprising:
sending, by the system equipment, a second discovery message over the communication path through the transmission line network;
receiving, from the first transmission line accessory, a third response over the communication path, wherein the third response is indicative that the first transmission line accessory is electrically connected to the transmission line network;
receiving, from the third transmission line accessory, a fourth response over the communication path; and
determining that the third transmission line accessory is parallel to the first transmission line accessory on the transmission line network when the fourth response does not include a series indicator.

20. The Method of Clause 13 Further Comprising:
updating an accessory mapping based on one or more responses to a third discovery message.

21. The Method of Clause 20 Further Comprising:
accessing an entry from the accessory mapping, the entry corresponding to an accessory group;
sending a fourth discovery message directed to the accessory group over the transmission line network;
determining whether one more resulting responses is inconsistent with the accessory mapping; and
based on the determining, generating a status indication associated with the accessory mapping.

22. The Method of Clause 13 Further Comprising:
determining a distance of the first transmission line accessory from the system equipment along the transmission line network based on the first RF loss.

23. A Non-Transitory Computer Readable Medium Storing Instructions Thereon that, when Read by a Computing Device, Causes the Computing Device to:
generate an uplink RF test signal to a first transmission line accessory at a first RF power level and a first frequency over a communication path provided by a transmission line network;
instruct a transmission line accessory to measure a first measured RF power level of the uplink RF test signal at the first transmission line accessory;
in response to the instructing, receive first measurement information indicative of the first measured RF power level;
determine an RF gain setting for an adjustable RF gain circuit at the first transmission line accessory based on the first RF power level and the first measured RF power level; and
in response to the determining, instruct the first transmission line accessory to adjust the adjustable RF gain circuit in accordance with the RF gain setting, wherein RF gain setting compensates for an RF loss through a downlink of the communication path.

24. The Non-Transitory Computer Readable Medium of Clause 23, Storing Instructions Thereon that, when Read by the Computing Device, Causes the Computing Device to:
generate the uplink RF test signal at a second frequency;

instruct the transmission line accessory to measure a second measured RF power level of the uplink RF test signal at the first transmission line accessory;

in response to the instructing, receive second measurement information indicative of the second measured RF power level;

determine an RF loss variation of the transmission line network over a plurality of frequencies, wherein the plurality of frequencies includes the first and second frequencies;

in response to the determining, sending configuration information indicative of the RF loss variation to the transmission line accessory.

25. A Transmission Line Accessory Supporting a Wireless Microphone System, the Transmission Line Accessory Electrically Connected to System Equipment Through a Transmission Line Network, the Transmission Line Accessory Comprising:

an RF power detector;
an adjustable RF gain circuit;
a controller;
the RF power detector measuring a measured power level of an uplink RF test signal, wherein the uplink RF test signal is received over a communication path established through the transmission line network; and
the controller reporting the measured power level of the uplink RF test signal and receiving an RF gain setting from the system equipment;
the controller configuring the adjustable RF gain circuit in accordance with the RF gain setting, wherein the RF gain setting compensates for an RF loss incurred in the transmission line network between the transmission line accessory and the system equipment.

26. The Transmission Line Accessory of Clause 25 Comprising:

the RF power detector measuring the uplink RF test signal over a plurality of frequencies;
the controller reporting frequent-dependent information to the system equipment, wherein the frequency-dependent information is indicative of an RF loss variation of the transmission line network over the plurality of frequencies;
the controller receiving configuration information is based on the RF loss variation.

27. The Transmission Line Accessory of Clause 26 Comprising:

the controller configuring the adjustable RF gain circuit in accordance with the configuration information.

28. The Transmission Line Accessory of clause 26 Comprising:

a compensation filter;
the controller configuring the compensation filter based on filter compensation information, wherein the configuration information includes the filter compensation information.

29. System Equipment Supporting a Wireless Microphone System, the System Equipment Electrically Connected to a Transmission Line Accessory Via a Transmission Line Network, the System Equipment Comprising:

a processing device;
a receiver configured to receive a downlink RF signal from the transmission line accessory over a communication path provided by the transmission line network;
a radio frequency (RF) source;
the RF source configured to generate an uplink RF test signal at a first RF power level to the transmission line accessory through the communication path;
the processing device configured to instruct the transmission line accessory to measure a second RF power level of the uplink RF test signal received at the transmission line accessory and configured to receive the second RF power level; and
the processing device configured to determine an RF gain setting from the first and second RF levels and configured to send configuration information indicative of the RF gain setting to the transmission line accessory, wherein the RF gain setting compensates for an RF loss incurred through a downlink of the communication path provided by the transmission line network.

30. The System Equipment of Clause 29 Comprising:

the RF source is configured to vary the uplink RF test signal over a plurality of frequencies through the communication path;
the processing device instructing the transmission line accessory to measure the uplink RF test signal over a plurality of frequencies and report frequency-dependent information to the system equipment, wherein the frequency-dependent information is indicative of an RF loss variation of the transmission line network over the plurality of frequencies; and
the processing device configured to modify the configuration information based on the RF loss variation.

31. The System Equipment of Clause 30 Comprising:

the processing device adjusting the RF gain setting based on the RF loss variation.

32. The System Equipment of Clause 30 Comprising:

the processing device instructing the transmission line accessory to configure a compensation filter based on the modified configuration information.

33. A Wireless Microphone System Comprising:

system equipment, wherein the system equipment includes a processing device and a receiver;
a first transmission line accessory, wherein the first transmission line accessory includes a first adjustable RF gain circuit;
a transmission line network electrically connecting the system equipment and the first transmission line accessory, wherein the receiver is configured to receive a downlink RF signal from a wireless microphone through the first transmission line accessory over a communication path provided by the transmission line network;
a test transmitter that positioned at an external stationary location with respect to the system equipment and the first transmission line accessory and configured to generate a downlink RF test signal at a first frequency to the first transmission line accessory through the communication path;
the first transmission line accessory configured to measure a first RF power level of the downlink RF test signal received at the first transmission line accessory and configured to report the first RF power level to the processing device;
the processing device configured to measure a second RF power level of the downlink RF test signal received at the system equipment;
the processing device configured to determine a first RF gain setting for the first adjustable RF gain circuit from the first and second RF power levels and configured to send configuration information indicative of the first RF gain setting to the first transmission line accessory; and
the first transmission line accessory configured to receive the configuration information and configured to adjust the first adjustable RF gain circuit, wherein the first adjustable RF gain circuit compensates for a first RF loss incurred through a downlink of the communication path provided by the transmission line network.

34. The Wireless Microphone System of Clause 33 Comprising:
  a second transmission line accessory, wherein the second transmission line accessory is in a series arrangement with the first transmission line accessory and is further from the system equipment than the first transmission line accessory along the transmission line network;
  the second transmission line accessory configured to measure a third RF power level of the downlink RF test signal received at the second transmission line accessory and configured to report the third RF power level to the processing device;
  the processing device configured to determine a second RF gain setting for a second adjustable RF gain circuit from the first and third RF power levels and configured to send configuration information indicative of the second RF gain setting to the second transmission line accessory; and
  the second transmission line accessory configured to receive the configuration information and configured to adjust the second adjustable RF gain circuit, wherein the second adjustable RF gain circuit compensates for a second RF loss incurred through the communication path provided by the transmission line network.

35. The Wireless Microphone System of Clause 33, Wherein:
  the test transmitter is capable of configuring the downlink RF test signal over a plurality of frequencies through the communication path;
  the processing device is configured to instruct the test transmitter to generate the downlink RF test signal at one of the plurality of frequencies;
  the first transmission line accessory is configured to measure the RF test signal over the plurality of frequencies and report frequency-dependent information to the system equipment, wherein the frequency-dependent information is indicative of an RF loss variation of the transmission line network over the plurality of frequencies; and
  the processing device configured to modify the configuration information based on the RF loss variation.

36. The Wireless Microphone System of Clause 35, Wherein the Processing Device Adjusts the First RF Gain Setting Based on the RF Loss Variation.

37. The wireless microphone system of clause 35, wherein the first transmission line accessory comprises a compensation filter, wherein the configuration information comprises filter compensation information, and wherein the first transmission line accessory configures the compensation filter based on the filter compensation information.

38. A Wireless Audio Monitoring System Comprising:
  an antenna port configured to receive an RF signal from an external device through a coaxial cable, wherein the external device comprises an external transmitter;
  a power detector configured to measure a measured power level of the received RF signal from the external transmitter; and
  a communication interface configured to send the measured power level via a communication path to the external device.

39. The Wireless Audio Monitoring System of Clause 38 Further Comprising:
  the external device configured to adjust a transmitted power of the external transmitter based on the measured power level received via the communication path, wherein the adjusted transmitted power compensates for RF losses between the external transmitter and the antenna.

40. A Wireless Microphone System Comprising:
  system equipment further comprising a primary controller and a receiver;
  a transmission line accessory comprising an RF power detector and an adjustable RF gain circuit;
  a transmission line network connecting the system equipment and the transmission line accessory, wherein the transmission line network comprises a coaxial cable and an optical fiber, wherein the receiver is configured to receive a downlink signal from a wireless microphone through the transmission line accessory over a communication path provided by the transmission line network;
  a far-end fiber interface comprising an RF source and a secondary controller, wherein the far-end fiber interface is located between the optical fiber and the coaxial cable and wherein the RF source is configured to generate an uplink RF test signal at a first RF power level to the transmission line accessory through the communication path over the coaxial cable;
  wherein the transmission line accessory is configured to measure a second RF power level of the uplink RF test signal received at the transmission line accessory and configured to report the second RF power level to the secondary controller;
  wherein the primary controller, in concert with the secondary controller through a control channel, is configured to determine an RF gain setting for the adjustable RF gain circuit from the first and second RF levels and configured to send configuration information indicative of the RF gain setting to the transmission line accessory through the coaxial cable; and
  wherein the transmission line accessory is configured to receive the configuration information and is configured to adjust the adjustable RF gain circuit, wherein the adjustable RF gain circuit compensates for an RF loss incurred on a downlink of the communication path provided by the transmission line network.

41. The Wireless Microphone System of Clause 40, Wherein the Control Channel Comprises a Local Area Network (LAN).

42. A wireless microphone system comprising:
  system equipment further comprising a system controller and a receiver;
  a transmission line accessory comprising an RF power detector and an adjustable RF gain circuit;
  an optical fiber cable comprising a communication optical fiber and an RF optical fiber;
  a transmission line network connecting the system equipment and the transmission line accessory, wherein the transmission line network comprises a coaxial cable and the RF optical fiber, wherein the receiver is configured to receive a downlink signal from a wireless microphone through the transmission line accessory over a communication path provided by the transmission line network;
  an optical fiber unit comprising an RF source, a first communication controller, and a second communication controller, wherein the optical fiber unit is located between the system equipment and the coaxial cable, wherein the communication optical fiber is connected between the first and second communication controllers, and wherein the RF source is configured to generate an uplink RF test signal at a first RF power level to the transmission line accessory through the communication path over the coaxial cable;

wherein the transmission line accessory is configured to measure a second RF power level of the uplink RF test signal received at the transmission line accessory and configured to report the second RF power level to the second communication controller;

wherein the system controller, in concert with the first and second communication controllers through a control channel, is configured to determine an RF gain setting for the adjustable RF gain circuit from the first and second RF levels and configured to send configuration information indicative of the RF gain setting to the transmission line accessory through the coaxial cable; and wherein the transmission line accessory is configured to receive the configuration information and is configured to adjust the adjustable RF gain circuit, wherein the adjustable RF gain circuit compensates for an RF loss incurred on a downlink of the communication path provided by the transmission line network.

43. The wireless microphone system of clause 42, wherein the control channel comprises the communication optical fiber and wherein the first and second communication controllers interface with the communication optical fiber.

44. A wireless microphone system comprising:
system equipment, wherein the system equipment includes a processing device and a receiver;
a first transmission line accessory, wherein the first transmission line accessory includes a first adjustable RF gain circuit;
a transmission line network electrically connecting the system equipment and the first transmission line accessory, wherein the receiver is configured to receive a downlink RF signal from a wireless microphone through the first transmission line accessory over a communication path provided by the transmission line network;
a test transmitter that positioned at an external stationary location with respect to the system equipment and the first transmission line accessory and configured to generate a downlink RF test signal at a first frequency to the first transmission line accessory through the communication path;
the first transmission line accessory configured to measure a first RF power level of the downlink RF test signal received at the first transmission line accessory and configured to report the first RF power level to the processing device;
the processing device configured to measure a second RF power level of the downlink RF test signal received at the system equipment;
the processing device configured to determine a first RF gain setting for the first adjustable RF gain circuit from the first and second RF power levels and configured to send configuration information indicative of the first RF gain setting to the first transmission line accessory; and
the first transmission line accessory configured to receive the configuration information and configured to adjust the first adjustable RF gain circuit, wherein the first adjustable RF gain circuit compensates for a first RF loss incurred through a downlink of the communication path provided by the transmission line network.

45. The wireless microphone system of clause 44 comprising:
a second transmission line accessory, wherein the second transmission line accessory is in a series arrangement with the first transmission line accessory and is further from the system equipment than the first transmission line accessory along the transmission line network;
the second transmission line accessory configured to measure a third RF power level of the downlink RF test signal received at the second transmission line accessory and configured to report the third RF power level to the processing device;
the processing device configured to determine a second RF gain setting for a second adjustable RF gain circuit from the first and third RF power levels and configured to send configuration information indicative of the second RF gain setting to the second transmission line accessory; and
the second transmission line accessory configured to receive the configuration information and configured to adjust the second adjustable RF gain circuit, wherein the second adjustable RF gain circuit compensates for a second RF loss incurred through the communication path provided by the transmission line network.

46. The wireless microphone system of clause 44, wherein:
the test transmitter is capable of configuring the downlink RF test signal over a plurality of frequencies through the communication path;
the processing device is configured to instruct the test transmitter to generate the downlink RF test signal at one of the plurality of frequencies;
the first transmission line accessory is configured to measure the RF test signal over the plurality of frequencies and report frequency-dependent information to the system equipment, wherein the frequency-dependent information is indicative of an RF loss variation of the transmission line network over the plurality of frequencies; and
the processing device configured to modify the configuration information based on the RF loss variation.

47. The wireless microphone system of clause 46, wherein the processing device adjusts the first RF gain setting based on the RF loss variation.

48. The wireless microphone system of clause 46, wherein the first transmission line accessory comprises a compensation filter, wherein the configuration information comprises filter compensation information, and wherein the first transmission line accessory configures the compensation filter based on the filter compensation information.

49. A wireless microphone system comprising:
system equipment further comprising a primary controller and a receiver;
a transmission line accessory comprising an adjustable RF gain circuit;
a transmission line network connecting the system equipment and the transmission line accessory, wherein the transmission line network comprises a coaxial cable and an optical fiber, wherein the receiver is configured to receive a downlink signal from a wireless microphone through the transmission line accessory over a communication path provided by the transmission line network;
a far-end fiber interface comprising an RF source and a secondary controller, wherein the far-end fiber interface is located between the optical fiber and the coaxial cable and wherein the RF source is configured to generate an uplink RF test signal at a first RF power level to the transmission line accessory through the communication path over the coaxial cable;

wherein the transmission line accessory is configured to measure a second RF power level of the uplink RF test signal received at the transmission line accessory and configured to report the second RF power level to the secondary controller;

wherein the primary controller, in concert with the secondary controller through a control channel, is configured to determine an RF gain setting for the adjustable RF gain circuit from the first and second RF levels and configured to send configuration information indicative of the RF gain setting to the transmission line accessory through the coaxial cable; and wherein the transmission line accessory is configured to receive the configuration information and is configured to adjust the adjustable RF gain circuit, wherein the adjustable RF gain circuit compensates for an RF loss incurred on a downlink of the communication path provided by the transmission line network.

50. The wireless microphone system of clause 49, wherein the control channel comprises a local area network (LAN).

51. A wireless microphone system comprising:
system equipment further comprising a system controller and a receiver;
a transmission line accessory comprising an adjustable RF gain circuit;
an optical fiber cable comprising a communication optical fiber and an RF optical fiber;
a transmission line network connecting the system equipment and the transmission line accessory, wherein the transmission line network comprises a coaxial cable and the RF optical fiber, wherein the receiver is configured to receive a downlink signal from a wireless microphone through the transmission line accessory over a communication path provided by the transmission line network;
an optical fiber unit comprising an RF source, a first communication controller, and a second communication controller, wherein the optical fiber unit is located between the system equipment and the coaxial cable, wherein the communication optical fiber is connected between the first and second communication controllers, and wherein the RF source is configured to generate an uplink RF test signal at a first RF power level to the transmission line accessory through the communication path over the coaxial cable;
wherein the transmission line accessory is configured to measure a second RF power level of the uplink RF test signal received at the transmission line accessory and configured to report the second RF power level to the second communication controller;
wherein the system controller, in concert with the first and second communication controllers through a control channel, is configured to determine an RF gain setting for the adjustable RF gain circuit from the first and second RF levels and configured to send configuration information indicative of the RF gain setting to the transmission line accessory through the coaxial cable; and
wherein the transmission line accessory is configured to receive the configuration information and is configured to adjust the adjustable RF gain circuit, wherein the adjustable RF gain circuit compensates for an RF loss incurred on a downlink of the communication path provided by the transmission line network.

52. The wireless microphone system of clause 51, wherein the control channel comprises the communication optical fiber and wherein the first and second communication controllers interface with the communication optical fiber.

53. A wireless audio system comprising:
a processing device;
a receiver;
a transmission line accessory further comprising an adjustable RF gain circuit;
a transmission line network electrically connecting the processing device and the transmission line accessory, wherein the receiver is configured to receive a downlink RF signal from a wireless device through the transmission line accessory over a communication path provided by the transmission line network;
a radio frequency (RF) source configured to generate an uplink RF test signal to the transmission line accessory through the communication path;
the transmission line accessory configured to measure the uplink RF test signal received at the transmission line accessory and configured to report the measured uplink RF test signal to the processing device;
the processing device configured to determine an RF gain setting for the adjustable RF gain circuit from the measured uplink RF test signal and configured to send configuration information indicative of the RF gain setting to the transmission line accessory; and
the transmission line accessory configured to receive the configuration information and configured to adjust the adjustable RF gain circuit, wherein the adjustable RF gain circuit compensates for an RF loss incurred on a downlink of the communication path provided by the transmission line network.

54. The wireless audio system of clause 53, wherein the RF source is configured to generate the uplink RF test signal at a first RF power level to the transmission line accessory through the communication path, wherein the transmission line accessory is configured to measure a second RF power level of the uplink RF test signal received at the transmission line accessory and configured to report the second RF power level to the processing device, and wherein the processing device is configured to determine the RF gain setting for the adjustable RF gain circuit from the first and second RF levels.

55. The wireless audio system of clause 53, wherein:
the RF source is configured to vary the uplink RF test signal over a plurality of frequencies through the communication path;
the transmission line accessory is configured to measure the uplink RF test signal over the plurality of frequencies and report frequency-dependent information to the processing device, wherein the frequency-dependent information is indicative of an RF loss variation through the transmission line network over the plurality of frequencies;
the processing device is configured to adjust the RF gain setting based on the RF loss variation; and
the transmission line accessory is configured to compensate for the RF loss variation based on the received configuration information from the processing device.

56. The wireless audio system of clause 53 comprising at least one transmission line accessory wherein:

the at least one transmission line accessory comprises the transmission line accessory;

the processing device is configured to send a discovery message over the communication path through the transmission line network;

when the at least one transmission line accessory receives the discovery message, the at least one transmission line accessory sends a response over the communication path to the processing device, wherein the response is indicative that the at least one transmission line accessory is electrically connected to the transmission line network; and the processing device updates mapping information about the at least one transmission line accessory over the transmission line network.

What is claimed is:

1. A method for compensating for a radio frequency (RF) loss incurred in a wired communication path of a wireless microphone system, the method comprising:
   receiving, at a first device and via the wired communication path, a first RF signal generated by a second device;
   sending, by the first device, a first measurement indication of a first measured power level of the first RF signal;
   sending, by the second device and based on the first measurement indication, a first gain indication of a first RF gain setting;
   adjusting, by the first device and based on the first gain indication, a first variable RF gain of the first device to the first RF gain setting; and
   receiving by the second device, via the first device, via the wired communication path, and using the first RF gain setting of the first device, a second RF signal that was generated based on a first signal received from a first wireless microphone.

2. The method of claim 1, further comprising:
   generating the first RF signal, by the second device, at a generated power level; and
   determining the first RF gain setting of the first device from the first measured power level and the generated power level.

3. The method of claim 2, further comprising:
   receiving, at a third device and via the wired communication path, a third RF signal generated by the second device, wherein the third device is located at a different location than the first device along the wired communication path;
   sending, by the third device, a second measurement indication of a second measured power level of the third RF signal;
   sending, by the second device and based on the second measurement indication, a second gain indication of a second RF gain setting; and
   adjusting, by the third device and based on the second gain indication, a second variable RF gain of the third device to the second RF gain setting.

4. The method of claim 3, wherein the second RF signal is received by the second device via the third device and the first device, and wherein the third device uses the second RF gain setting.

5. The method of claim 3, further comprising:
   receiving by the second device, via the third device, via the wired communication path, and using the second RF gain setting of the third device, a fourth RF signal that was generated based on a second signal received from a second wireless microphone.

6. The method of claim 1, further comprising:
   varying, by the second device, the first RF signal over a plurality of frequencies through the wired communication path;
   measuring, by the first device, the first RF signal over the plurality of frequencies;
   in response to the measuring, sending, by the first device, frequency-dependent information about a RF loss variation; and
   modifying, by the second device, the first gain indication, based on the RF loss variation.

7. A method for compensating for a radio frequency (RF) loss incurred in a wired communication path of a wireless microphone system, the method comprising:
   measuring one or more uplink RF signals, transmitted via the wired communication path and varied over a plurality of frequencies, for adjustment of a downlink gain setting;
   sending an indication of an RF loss variation, of the wired communication path, based on the measured one or more uplink RF signals;
   receiving one or more instructions, based on the RF loss variation, for the adjustment of the downlink gain setting; and
   sending, using the downlink gain setting after the adjustment and via the wired communication path, a downlink RF signal that was generated based on a signal received from a wireless microphone, wherein the downlink RF signal is for generation of an audio signal.

8. The method of claim 7, further comprising:
   receiving the one or more uplink RF signals, transmitted at a first RF power level, via the wired communication path;
   measuring a second RF power level of the one or more uplink RF signals received at a designated location along the wired communication path; and
   determining the downlink gain setting from the first RF power level and the second RF power level.

9. A wireless microphone system comprising:
   a first device; and
   a second device;
      wherein the first device is configured to:
         receive, via a wired communication path, a first radio frequency (RF) signal;
         send a first measurement indication of a first measured power level of the first RF signal; and
         adjust, based on a first gain indication, a first variable RF gain of the first device to a first RF gain setting; and
      wherein the second device is configured to:
         send, based on the first measurement indication, the first gain indication of the first RF gain setting; and
         receive, via the first device, via the wired communication path, and using the first RF gain setting of the first device, a second RF signal that was generated based on a first signal received from a first wireless microphone.

10. The wireless microphone system of claim 9, wherein the second device is further configured to:
    generate the first RF signal at a generated power level; and
    determine the first RF gain setting of the first device from the first measured power level and the generated power level.

11. The wireless microphone system of claim 10, further comprising a third device,
- wherein the third device is configured to:
  - receive, via the wired communication path, a third RF signal generated by the second device, wherein the third device is located at a different location than the first device along the wired communication path;
  - send a second measurement indication of a second measured power level of the third RF signal; and
  - adjust, based on a second gain indication, a second variable RF gain of the third device to a second RF gain setting; and
- wherein the second device is further configured to:
  - send, based on the second measurement indication, the second gain indication of the second RF gain setting.

12. The wireless microphone system of claim 11, wherein the second device is configured to receive the second RF signal via the third device and the first device, and wherein the third device is configured to use the second RF gain setting.

13. The wireless microphone system of claim 11, wherein the second device is further configured to receive, via the third device, via the wired communication path, and using the second RF gain setting of the third device, a fourth RF signal that was generated based on a second signal received from a second wireless microphone.

14. The wireless microphone system of claim 9, wherein the second device is further configured to:
- vary the first RF signal over a plurality of frequencies through the wired communication path; and
- modify, based on an RF loss variation, the first gain indication; and
- wherein the first device is further configured to:
  - measure the first RF signal over the plurality of frequencies; and
  - send, based on measurement of the first RF signal over the plurality of frequencies, frequency-dependent information about the RF loss variation.

15. The wireless microphone system of claim 9, wherein the system further comprises the first wireless microphone, and wherein the first wireless microphone is configured to send, to the first device, the first signal.

16. A transmission line accessory comprising for compensating for a radio frequency (RF) loss incurred in a wired communication path of a wireless microphone system, wherein the transmission line accessory comprises:
- one or more processors; and
- memory storing instructions that when executed cause the transmission line accessory to:
  - receive, via the wired communication path, a first RF signal;
  - send a first measurement indication of a first measured power level of the first RF signal;
  - receive a first gain indication of a first RF gain setting that is based on the first measurement indication;
  - adjust, based on the first gain indication, a first variable RF gain to a first RF gain setting; and
  - send, via the wired communication path and using the first RF gain setting, a second RF signal that was generated based on a first signal received from a first wireless microphone.

17. The transmission line accessory of claim 16, wherein the instructions, when executed, further cause the transmission line accessory to:
- measure the first RF signal over a plurality of frequencies; and
- send, based on measurement of the first signal over the plurality of frequencies, frequency-dependent information about a RF loss variation.

18. The transmission line accessory of claim 16, further comprising a compensation filter, wherein the transmission line accessory is configured adjust the first variable RF gain to the first RF gain setting using the compensation filter.

19. The transmission line accessory of claim 16, wherein the instructions, when executed, further cause the transmission line accessory to:
- receive a discovery message; and
- send, based on the discovery message, a first response over the wired communication path, wherein the first response indicates that the transmission line accessory is electrically connected to a transmission line network.

20. The transmission line accessory of claim 16, wherein the instructions, when executed, further cause the transmission line accessory to:
- receive one or more uplink RF signals, transmitted at a first RF power level, via the wired communication path;
- measure a second RF power level of the one or more uplink RF signals received at a designated location along the wired communication path; and
- determine the first RF gain setting from the first RF power level and the second RF power level.

* * * * *